US008433797B2

(12) United States Patent
Vendrow et al.

(10) Patent No.: US 8,433,797 B2
(45) Date of Patent: Apr. 30, 2013

(54) USER INTERFACE FOR ACCESSING MESSAGES

(71) Applicants: Vlad Vendrow, Redwood Shores, CA (US); Vladimir Shmunis, Burlingame, CA (US)

(72) Inventors: Vlad Vendrow, Redwood Shores, CA (US); Vladimir Shmunis, Burlingame, CA (US)

(73) Assignee: RingCentral, Inc., San Mateo, CA (US)

( * ) Notice: Subject to any disclaimer, the term of this patent is extended or adjusted under 35 U.S.C. 154(b) by 0 days.

(21) Appl. No.: 13/623,758

(22) Filed: Sep. 20, 2012

(65) Prior Publication Data

US 2013/0018945 A1 Jan. 17, 2013

Related U.S. Application Data

(63) Continuation-in-part of application No. 13/084,519, filed on Apr. 11, 2011.

(60) Provisional application No. 61/537,532, filed on Sep. 21, 2011.

(51) Int. Cl.
*G06F 15/173* (2006.01)

(52) U.S. Cl.
USPC .......................................... 709/224; 709/226

(58) Field of Classification Search .................. 709/224, 709/226
See application file for complete search history.

(56) References Cited

U.S. PATENT DOCUMENTS

| | | | |
|---|---|---|---|
| 6,350,066 B1 | 2/2002 | Bobo | |
| 6,938,079 B1 * | 8/2005 | Anderson et al. | 709/222 |
| 7,702,669 B2 | 4/2010 | Vendrow | |
| 7,752,326 B2 * | 7/2010 | Smit | 709/231 |
| 8,060,639 B2 * | 11/2011 | Smit et al. | 709/231 |
| 2008/0201389 A1 | 8/2008 | Cohen | |
| 2009/0150486 A1 | 6/2009 | Franco | |
| 2009/0305221 A1 * | 12/2009 | Gorup et al. | 434/433 |
| 2011/0072114 A1 * | 3/2011 | Hoffert et al. | 709/219 |
| 2011/0119722 A1 * | 5/2011 | Kellerman et al. | 725/110 |
| 2011/0119723 A1 * | 5/2011 | Erickson et al. | 725/110 |
| 2011/0125594 A1 * | 5/2011 | Brown et al. | 705/14.73 |

(Continued)

OTHER PUBLICATIONS

U.S. Appl. No. 13/623,770, filed Sep. 20, 2012, entitled "System and Method for Providing a Protocol for Message Data"; Inventor: Vlad Vendrow.

(Continued)

*Primary Examiner* — Karen Tang
(74) *Attorney, Agent, or Firm* — Stattler-Suh PC

(57) ABSTRACT

Described herein are systems and methods for providing a message UI engine for accessing messages on a message system. The message system may comprise a message storage system (that store messages of varying types and formats, such as fax, text, voice/audio, video, and picture messages) and a message access system. The message UI engine is configured by a Flash media UI file for accessing messages and associated message information by interacting with the message access system. The Flash media UI file does not comprise any markup language and comprises only Flash® instructions. The Flash media UI file also comprises a plurality of embedded applications for presenting the plurality of different message types, each embedded application comprising only Flash instructions. The associated message information may be stored and transmitted in a non-markup language format, such as comma-delimited format. The messages and message information may be transmitted using a non-HTTP protocol.

28 Claims, 28 Drawing Sheets

U.S. PATENT DOCUMENTS

| | | | |
|---|---|---|---|
| 2011/0161348 A1* | 6/2011 | Oron | 707/769 |
| 2011/0231265 A1* | 9/2011 | Brown et al. | 705/14.73 |
| 2011/0292224 A1* | 12/2011 | Caleca et al. | 348/207.2 |
| 2012/0047442 A1* | 2/2012 | Nicolaou et al. | 715/738 |
| 2012/0054777 A1* | 3/2012 | Xiques et al. | 719/318 |
| 2012/0096056 A1* | 4/2012 | Thomas | 707/822 |
| 2012/0096092 A1* | 4/2012 | Davidge et al. | 709/206 |
| 2012/0173981 A1* | 7/2012 | Day | 715/719 |

OTHER PUBLICATIONS

U.S. Appl. No. 13/084,519, filed Apr. 11, 2011, entitled "Accessing User Messages at a Hosted Communications Provider"; Inventors: Vlad Vendrow and Vladimir Shmunis.

Office Action issued by the USPTO on Jan. 7, 2013 for U.S. Appl. No. 13/623,770.

* cited by examiner

USER INTERFACE FOR ACCESSING MESSAGES

RELATED APPLICATIONS

This patent application claims the benefit of priority and is a continuation-in-part of the U.S. patent application entitled "Accessing User Messages at a Hosted Communications Provider," having Ser. No. 13/084,519, filed on Apr. 11, 2011, which claims the benefit of priority Under 35 U.S.C. §119(e) of U.S. Provisional Application Ser. No. 61/322,659, filed on Apr. 9, 2010. The disclosures of these prior applications are expressly incorporated herein by reference. This patent application also claims the benefit of priority, under 35 U.S.C. §119(e), of U.S. Provisional Application No. 61/537,532, filed Sep. 21, 2011, entitled "USER INTERFACE FOR ACCESSING MESSAGES," which is expressly incorporated herein by reference.

COPYRIGHT

Figures included in this patent document contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to all software, data, and user interfaces described below and in the drawings that form a part of this document: Copyright 2011 RingCentral, Inc. All Rights Reserved.

FIELD OF THE INVENTION

The present invention relates to message systems and, more specifically, to a systems, methods and techniques for providing access to messages on message systems.

BACKGROUND OF THE INVENTION

Message systems of the type with which the invention may find particular utility may be maintained by a business or other organization for use by its own personnel, or by a communications services provider that provides its services on behalf of its customers and their personnel. The message system may receive, store, and provide access to messages through a network, such as the Internet. Messages may be sent from a sending client device (e.g., fax machine, cell phone, etc.) through the Internet and/or a Public-Switched Telephone Network (PSTN) and eventually routed to the message system. The messages may then be converted to a digital message file in a particular format, if not already in that format, and stored by the message system. For example, a facsimile message may be converted to portable document format (pdf) and stored as a .pdf file on the message system and a voice message may be converted to MP3 format and stored as an .mp3 file on the message system.

To provide access to the messages, the message system may provide a website that provides remotely located and often geographically dispersed recipients access to a list of their messages, and may include a server to furnish the message list as well as those messages stored in the message system that are selected by the intended recipients. The messages are typically furnished in a well-known format, such as in hyper-text mark-up language (HTML).

The intended recipient of the messages may use a receiving client device to access his/her messages stored on and assessable from the message system. The receiving client device may have a browser to provide a user interface (UI) to provide access to the messages through the Internet. Typically, a UI formatted in hyper-text mark-up language (HTML) may be used to access facsimile or voice messages on the message system. For example, the UI may display the list of messages described above, and, in response to "selection" by the recipient of a particular facsimile message, may display the facsimile message through a separate document viewer program in a popup window or playback a voice message through a separate audio player program in a popup window.

However, as different types of messages and formats increase, the complexity of providing access to the messages also increases. In particular, conventional UIs are limited in their capability of presenting messages and formats of widely varying types. Further, conventional UIs are not able to meet user demand for a more seamless and easier way to access messages from the message system.

SUMMARY

Described herein are systems and methods for enabling access by intended recipients to diverse types of messages on a message service system via user interfaces of client devices. The message service system comprises a message storage system and a message access system, e.g., both located at a datacenter. The message storage system receives messages from sending client devices and stores messages in varying types and formats. The message access system provides access to the messages stored on the message storage system by intended recipients of the messages.

The message access system comprises different types of servers, namely, a program server and a message server. The program server stores a UI file in a suitable format, such as an .swf file, and transfers or serves the UI file to one or more client devices to enable each client device, once the UI file is installed, to access the messages. The UI file installed on a client device constitutes a UI engine that interacts with the message server to access messages. More specifically, in response to the UI engine, the message server obtains particular messages from the message storage system (e.g., those selected by a user from a browser-displayed message list), and furnishes or serves those messages to the client device. In other embodiments, a single server can perform the functions of both the program and message servers.

Preferably, the UI file comprises only Adobe® Flash® programming instructions (as specified by Adobe Systems Incorporated), without any markup language. As such, the UI file comprises a compilable file or files having only compilable and executable program instructions compatible with a Flash® Player, and thus can be referred to as "Flash media UI file". Preferably, the Flash media UI file is in the Small Web Format (SWF) format as an .swf file, although data (such as video) in other formats may be embedded therein.

A client device may download a Flash media UI file over a network, such as the Internet. Once downloaded and installed, the client device may comprise a Flash UI engine having computer hardware configured by the Flash media UI file. To access the messages, the client device includes a web browser that enables the Flash UI to interact with the message access system through a network, such as the Internet. Preferably, the web browser has a Flash® Player and the Flash media UI file as a Flash plug-in program.

The message storage system may store messages of various message types, including facsimile, text, voice/audio, video, picture messages, or any combination thereof, depending on the implementation. Each message type may be converted and/or stored in one or more different format types. For example, audio/voice messages may be stored in a plurality of different audio formats such as MP3, Audio Interchange File Format (AIFF), Waveform Audio File Format (WAV), etc. The Flash UI is configured to present (e.g., display or playback) such messages of widely varying types and formats.

The Flash media UI file may include one or more different embedded applications, each embedded application configured for decoding and presenting one or more different message types in one or more different formats. In some embodiments, the Flash media UI file may include a first embedded application for presenting a first message type and a second embedded application for presenting a second message type. In other embodiments, the Flash media UI file may include a single embedded application for presenting a plurality of different message types. For example, the Flash media UI file may include an audio player for presenting audio messages and a video player for presenting video messages. Or, the Flash media UI file may include an audio/video player for presenting audio and video messages. An embedded application may be configured to present a plurality of different format types for a message type. For example, the Flash UI may include a first embedded application for presenting video messages in a plurality of different formats. Alternatively, the Flash UI may include additional embedded applications for presenting different format types of the same message type. For example, the Flash UI may include a first embedded application for presenting video messages in a first format and a second embedded application for presenting video messages in a second format. The Flash UI may also comprise a plurality of embedded applications within the Flash UI for performing other message functions, such as message forwarding, message delete, blocking sender, calling sender, adding a contact, etc. Preferably, each embedded application may comprise a Flash® program comprising only Flash® programming instructions.

The Flash UI preferable leverages the multimedia capabilities of Flash programs. As known in the art, Flash programs provide superior capabilities in controlling and presenting multimedia files of different format types and may provide faster responses to user actions. Flash programs typically provide high quality of playback as well as fast loading and executing of multimedia files. Flash programs may also provide support for various types of media files and formats. When executed on the client device, the Flash media UI file may present messages of varying types and formats in a seamless and integrated manner using Flash-based programming.

In addition to the capabilities of Flash programs in controlling and presenting different multimedia files, Flash programs also provide strong support and capabilities for media streaming. The Flash UI may leverage this support by streaming messages of different media types to the receiving client device upon receiving user selections for presenting the messages. For example, upon receiving a request from the user to present an audio or video message, the Flash UI may stream the audio or video message from the message service system and present the audio or video message on the receiving client device.

Further, Flash programs also provide strong support and capabilities for local storing and caching of data. In an alternative embodiment, the Flash UI may leverage this local caching support by downloading and storing, prior to receiving any user selection for presenting any of the current messages, all current messages for an intended recipient (user) to a local storage device on the receiving client device. Upon receiving a request from the user to present (e.g., display or playback) a particular message, the message may be retrieved and presented from the local storage device without requiring the message to be downloaded/received from the message service system. As such, the receiving client device may be connected with the message service system (e.g., via the Internet) to receive and locally store all current messages all at one time without receiving any user selection for presenting any current message (whereby the current messages have not yet been selected for presentation by a user). The receiving client device then no longer requires a connection with the message service system to present messages upon user request, since any requested messages may now be retrieved and presented from local storage.

As noted above, a message is converted and stored as a digital message file. The terms "message" and "message file" may be used interchangeably herein. A message file may have associated metadata describing the message file, such as a size of the message (e.g., time length of the message, number of pages of the message), identifier for the sending client device (e.g., sender name and/or phone number), a user identifier for the intended recipient (e.g., username and/or phone number), the message type, the date and time the message was received, etc. The associated metadata may be referred to herein as "message information." The message information may be stored along with the associated message file in the message storage system and transmitted to various components along with the associated message file or may be separately transmitted to the various components. Preferably, the message information is stored and transmitted in a non-markup language format, such as a comma-delimited format.

The message files and associated message information comprise "message data." Preferably, message data is transmitted between the various components using a non-HyperText Transfer Protocol (non-HTTP), such as a custom protocol or a standard protocol (e.g., File Transfer Protocol (FTP)) that is a non-HTTP protocol. For example, message data transmitted between the receiving client device and any components of the message service system, such as the message server and the message storage system, may be transmitted using a non-HTTP protocol. In further embodiments, the Flash media UI file stored on the program server is transmitted to the receiving client device using a non-HTTP protocol, such as a custom protocol or standard protocol (e.g., FTP) that is a non-HTTP protocol.

BRIEF DESCRIPTION OF THE DRAWINGS

The novel features are set forth in the appended claims. However, for purpose of explanation, several embodiments of the invention are set forth in the following figures.

DETAILED DESCRIPTION

Figure 1:
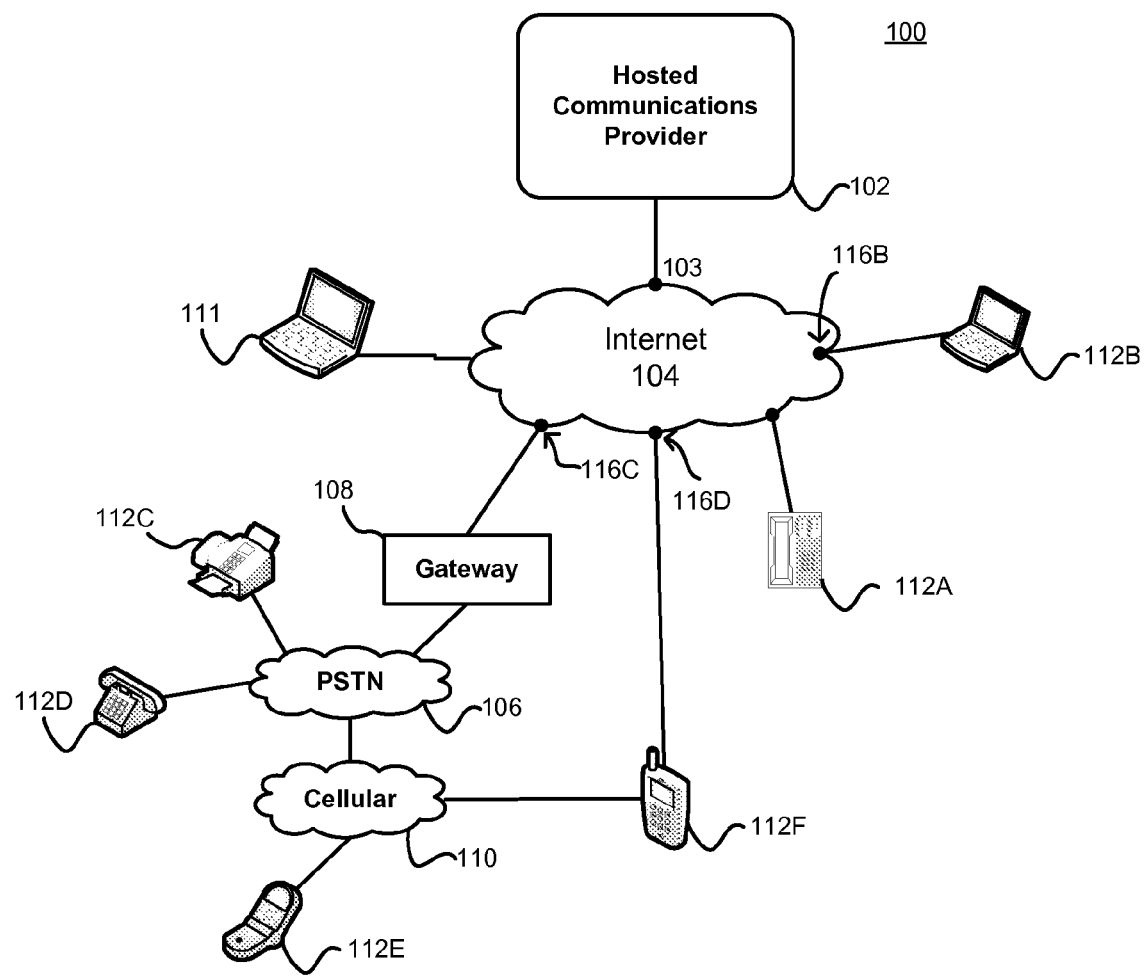
FIG. 1 shows an example of a high-level block diagram of a communications network.

The disclosures of U.S. patent application Ser. No. 13/084,519, filed on Apr. 11, 2011, entitled "Accessing User Messages at a Hosted Communications Provider," and U.S. Provisional Patent Application No. 61/322,659, filed on Apr. 9, 2010, are hereby expressly incorporated herein by reference. Further, U.S. Provisional Patent Application No. 61/537,532, filed Sep. 21, 2011, entitled "USER INTERFACE FOR ACCESSING MESSAGES," is expressly incorporated herein by reference.

In the following description, numerous details are set forth for purpose of explanation. However, one of ordinary skill in the art will realize that the embodiments described herein may be practiced without the use of these specific details. In other instances, well-known structures and devices are shown in block diagram form in order to not obscure the description with unnecessary detail.

The description that follows is divided into four sections. Section I contains terms used herein. Section II describes accessing user messages at a hosted communications provider. Section III describes a message environment in which some embodiments operate, a message service system, and a Flash UI engine for accessing messages. Section IV describes screen shots and functions of the Flash UI engine.

I. Terms

Flash UI: The Flash UI comprises a Flash UI engine having computer hardware configured by a compilable Flash media UI file, comprising programming instructions without markup language, to perform embodiments herein. The Flash UI engine comprises a message UI engine, a settings UI engine, and one or more embedded application engines, each such engine comprising computer hardware configured by the Flash media UI file to perform embodiments herein. The Flash UI engine is compatible with a Flash® Player. As used herein, the terms "message UI" and "message UI engine" may be used interchangeably, and the terms "settings UI" and "settings UI engine" may be used interchangeably.

Flash media UI file: The Flash media UI file comprises a compilable file (a file able to be compiled) having only program instructions that are compilable into machine language that is executable by a computer processor. A compilable file may comprise a file that is directly compilable to machine language in one step or indirectly compilable to machine language through multiple compiling or interpreting steps (e.g., a first step to produce assembly language and a second step to produce machine language). The Flash UI engine may include a computer processor that executes the compilable Flash media UI file to perform embodiments herein. The Flash media UI file may comprise programming instructions for a message UI, a settings UI, and one or more embedded applications for performing various functions described herein. Preferably, the Flash media UI file is in the Small Web Format (SWF) format as a .swf file. The Flash media UI file does not comprise any markup language, whereby the Flash media UI file comprises a file format other than markup language format. Preferably, the Flash media UI file comprises only Flash® programming instructions.

Message/message file: As used herein, a message is received from a sending client device and converted and stored as a digital "message file." Message files may comprise a plurality of different message types (e.g., fax, text, audio, video, picture, etc.) or any combination thereof depending on the implementation) converted to a plurality of different format types (e.g., MP3, TIFF, pdf, etc.). Message files are presented (e.g., displayed or played back) to the user using an appropriate embedded application within the message UI. The embodiments below are described in relation to a file. In other embodiments, any other type of storage object other than a file may be used. As used herein, a storage object comprises any logically definable storage element stored or contained within a storage system (such as a file, logical unit, volume, aggregate, storage device, etc.). In these embodiments, a storage object comprises any type of container for storing and/or transferring data.

Message information: A message file may have associated metadata describing the message file, such as a size of the message (e.g., time length of the message, number of pages of the message), identifier for the sending client device (e.g., sender name and/or phone number), a user identifier for the intended recipient (e.g., username and/or phone number), the message type, the date and time the message was received, etc. The associated metadata may be referred to herein as "message information." Preferably, the message information is formatted in a non-markup language, such as comma-delimited format.

Message list: A "message list" for a user may present message information about all of the messages associated with a user.

Message data: The message files and associated message information may be referred to collectively as "message data."

Sending client device: As used herein, a sending client device is used by a sender of a message for producing and transmitting messages. Examples of a sending client device include a fax machine, a cellular phone, smartphone, Voice Over IP (VoIP) phone, a computer configured to run communications software applications, a telephone, etc.

Receiving client device: As used herein, a receiving client device is used by an intended recipient of messages (referred to herein as a "user") to access messages on the message service system. The intended recipient is a current user/subscriber of the message service system. Examples of a receiving client device include a computer desktop, laptop, cellular phone, smartphone, etc.

Message service system: As used herein, a message service system comprises a message storage system and a message access system. The message storage system may receive messages from sending client devices and store messages of varying types and formats. The message access system may provide access to the stored messages to receiving client devices. The message access system may comprise a program server (for storing and transferring a message UI), a message server (for providing access to messages and message information), and an account database (for storing message information regarding the messages).

II. Accessing User Messages at a Hosted Communications Provider

Networks that provide hosted voice, messaging, and data services to users may be provided by a virtual private branch exchange (vP12), which handles communications using a Voice over Internet Protocol (VoIP) service. To callers outside the network, the vP12 appears as a traditional P12, enabling small businesses and organizations to provide a consistent, professional customer-facing interfacing. VoIP provides a method to deliver voice communications over the Internet rather than through circuit-switched networks. The communications may originate and terminate at VoIP devices, or a gateway may be used to route calls from the Internet to a Public-Switched Telephone Network (PSTN). Some of the services offered by these networks, or hosted communications providers, include the ability to process telephony calls, to transmit and receive voicemail, to transmit and receive text and data messages, and/or to transmit and receive fax messages. User access the hosted communications to take advantage of these services. As user device types and message formats increase, so too the complexity of the network increases.

A hosted Private Branch Exchange (P12) system provides services through a network cloud which performs as a traditional P12. The cloud includes a configuration of servers coupling the system users to a large area network, such as the Internet. A hosted P12 may provide unified communication systems and unified messaging systems integrate multiple services for a user, making communication and messaging more flexible to the activities and devices of the user. Unified Communications (UC) generally integrates real-time communication services, such as instant messaging (chat), with non-real-time communication services, such as e-mail. Unified Messaging (UM) generally integrates non-real time communications, such as Voice Mail (VM), e-mail, texting, Short Message Services (SMS), and fax. As users expand their mobility, variety of devices, and platforms, the complexity of UC and UM systems increases.

A hosted communications provider provides a variety of services to a variety of users. This matrix of operating devices, features and messaging introduces challenges and advantages. The challenges involve supporting a wide variety of services and enabling interoperability of devices. The advantages include the ability to deliver messages and content over a variety of channels, including different delivery and messaging formats, and a variety of routing strategies. For example, a mobile to landline communication may be routed from the mobile to a cellular network to the Internet to the network; and from network to the Internet to a PSTN to a landline phone. Similarly, the users may send text messages while engaging in a conference call and receiving voice mail messages.

The example of communication system 100 implements user partitioning. The communication system 100 can be, for example, a hosted private branch exchange (P12) system, which may also be referred to as a vP12, a cloud-based P12, an internet telephony system, or an Internet Protocol (IP) P12. Unlike a premise-based P12, which requires P12 equipment to be physically located on or near the user premises where the P12 services are to be provided, a hosted P12 can provide P12 communication services over the Internet, including services such as, without limitation, Voice over Internet (VoI), Voice over IP (VoIP), facsimile over IP (FoIP), call forwarding, voicemail, web-based online account management, and other similar P12 functions. The communication system 100 may include data centers (not shown), wherein each data center may be a point of presence having one or more servers, routers, switches, and/or network connections necessary to support the communication system 100. Each data center may be located in a same or different geographical location or region.

Unified communication systems and unified messaging systems integrate multiple services for a user, making communication and messaging more flexible to the activities and devices of the user. Unified Communications (UC) generally integrates real-time communication services, such as instant messaging (chat), with non-real-time communication services, such as e-mail. Unified Messaging (UM) generally integrates non-real time communications, such as Voice Mail (VM), e-mail, texting, Short Message Services (SMS), and fax. As users expand their mobility, variety of devices, and platforms, the complexity of UC and UM systems increases.

In some implementations, a communication system for processing user accounts in a hosted P12 system can include vP12 system. Such systems may provide UC and UM systems that enable users to send a message in one medium and receive communications on another medium, including when the message and communications are part of a communication string. The example of communication system implements user partitioning. The communication system may be, for example, a hosted P12 system, a cloud-based P12, an internet telephony system, or an Internet Protocol (IP) P12. Unlike a premise-based P12, which requires P12 equipment to be physically located on or near the user premises where the P12 services are to be provided, a hosted P12 can provide P12 communication services over the Internet, including services such as, without limitation, Voice over Internet (VoI), Voice over IP (VoIP), facsimile over IP (FoIP), call forwarding, voicemail, web-based online account management, and other similar P12 functions. The communication system may include data centers (not shown), wherein each data center may be a point of presence having one or more servers, routers, switches, and/or network connections necessary to support the communication system. Each data center may be located in a same or different geographical location or region.

In some implementations, a communication system for processing user accounts in a hosted P12 system provides UC and UM systems that enable users to send a message in one medium and receive communications on another medium, including when the message and communications are part of a communication string. In one example a unified messaging system integrates several different communications media to allow a user to send and retrieve voice, fax, data, and other messages (e.g., e-mail, text, SMS) from a single interface, while allowing access to a variety of devices, such as a telephone Land Line (LL), a fax device, a cellular telephone, a Personal Computer (PC), other types of wireless devices, and so forth. The interface is a network, which processes communications with multiple devices. Some of the devices support multiple messaging protocols, such as plain text, HTML, and others. A hosted network or communication provider, such as a vP12, may support some or all of these formats.

For example, messages may be sent in a plain text format. A plain text message is a widely accepted form of messaging; e-mail message readers are generally able to display text messages in plain text format. A cross-platform messaging format allows document interchange between systems, which allows portability of files. One type of cross-platform messaging format is the Rich Text Format (RTF). Another format is the HTML format which allows display of rich content in a message. Using an HTML mail format, the message is sent as an HTML page, including tags to change the appearance of the text. The recipient's e-mail client program then formats and displays the HTML.

It is possible to merge and/or combine multiple formats, such as to mix plain text with HTML. In this way, a network is able to send messages to external domains as plain text and as HTML.

The Multipurpose Internet Mail Extensions (MIME) is an Internet standard that extends the format of e-mail to support non-text attachments, multiple part message bodies, American Standard Code for Information Interchange (ASCII) and non ASCII text and header information. User-written Internet e-mail, as well as automated e-mail, is often transmitted via Simple Mail Transfer Protocol (SMTP) in MIME format. Internet e-mail may be referred to as SMTP/MIME e-mail. The content types defined by MIME standards are applicable to a variety of communication protocols, such as Hypertext Transfer Protocol (HTTP) for the World Wide Web (WWW). HTTP specifies that data be transmitted in the context of e-mail-like messages, although the data most often is not actually e-mail.

The user-to-user encoding (uuencode) is a form of binary-to-text encoding, which is used to convert data to fairly common characters which will be understood by multiple systems. The program uudecode reverses the effect of uuencode, recreating the original binary file exactly. These formats, uuencode/decode, became popular for sending binary files by e-mail and posting to news groups. MIME may be combined with a uuencode which merges two different methods of sending binary attachments with messages. Message text word wrapping The proliferation of wireless devices has added to the messaging formats available. Short Message Service (SMS) is a simple, common type of text message supported by a large number of mobile phones. Proprietary messaging, such as "Smart Messaging" by Nokia, allow users to create messages with a variety of features. For example, such messaging may allow pictures, ring tones, virtual business cards or other types of non-text data, all within a message that is often compatible with the SMS text standard. In other words, although these messages may contain non-text content, they still use SMS text data stream to communicate the data.

The Multimedia Messaging Service (MMS) format also allows a user to create messages with text, picture, music and other content. MMS messages may consist of multiple pages, each page with its own text, picture, music, and so forth. MMS is currently employed by many mobile phones.

A network may support a variety of messaging formats, and may further support a variety of services and applications for users. Such a unified messaging system includes a network, which may be implemented as one or more servers, including a data memory to store messages, which may include messages of different types and of different communications media (e.g., received messages, sent messages, voicemail messages, fax messages, etc.). Messages may be grouped into message clusters, or mailboxes, associated with one or more individual user, or groups of users. In some embodiments, an individual message includes, but is not limited to, a unique message index (e.g. identifiers), message content (e.g., voice, video, data), message properties (e.g., date and time, sender information), and message status (e.g., read, unread). A particular combination of message indexes and message statuses of the messages in a given message cluster is referred to as the state of the messages in the given cluster.

The system may further include a variety of devices for communication, each of the devices associated with or accessible by users. In some implementations, the wireless devices support a Wireless Local Area Network (WLAN) over the air protocol, such as those supporting Wi-Fi or Bluetooth communications. The wireless devices may further support multiple wireless protocols.

A system may implement call processing techniques and methods which provide call routing to multiple of the devices. For example in one scenario, a voice call to a user is processed by a default path first, such as to a particular device, and then may be routed to another device according to routing rules. Such routing rules may direct the call to a LL telephone first, and then to a cellular telephone.

A user in such a hosted system, or hosted communications provider, has an associated account which is accessed through the system. In one example, the network receives a communications message directed to a user of the hosted communications provider. The system stores the communications message in a local storage device, such as a memory storage device or dedicated memory storage unit. As the system is configured to process digital communications according to and Internet Protocol (IP), the system is able to process web requests and has a web server module. A web server module receives an access request from a user; the access request is to access the user's account and is sent by the user through a web browser module installed on a client device. The client device supports web interactions and displays a user interface allowing the user to request access to the account and to view the information associated with the user account, which information is provided by the web server module of the system. In the present example, the system responds to the access request by sending information to the user's client device, wherein at least a portion of the user interface information is provided in a file format which does not include hypertext markup language (HTML) formatted data. The file format is intended for use by a display module working with the web browser module installed on the client device. The display module may be any of a variety of devices.

Users may access their stored messages from the hosted communications providers in several ways. For example, users can access their messages by retrieving them over a phone (mobile or landline), by receiving messages in email attachments, by receiving them over a fax machine, or by using a web browser. When a web browser is used by a user to access messages, the user typically uses a web browser installed on a local computer (the client) to connect to a web server belonging to the hosted communications provider, and view the messages that have been stored in the user's account. The user may also have the option to download the messages from the web server to the local computer. Typically, the user provides a password to log in to a webpage that displays information specific to the user's account, which includes, but is not limited to: the messages available for viewing or retrieval, information associated with the messages such as the time the message was received or the sender's identification information, account settings and preferences, etc.

There are many different web browsers that a user can use to log in to an online account. When a user logs in to the user's account, the hosted communication provider's web server typically serves up a user interface for the user that is formatted using hypertext markup language (HTML). However, a user interface transmitted in html can look different, depending on which web browser is used to view the user interface. This causes the user to have a different experience when logging in using one browser than with another, even though the user's account settings and preferences may stay the same. HTML is also not as well-suited for displaying multimedia files or interactive webpages. It would be desirable to provide a user with a uniform experience when viewing the user's account online, regardless of which web browser is used.

FIG. 1 is an example of a block diagram of a communications network 100. The communications network 100 includes a hosted communications provider 102, a packet-switched network (such as the Internet) 104, a PSTN 106, a PSTN-VoIP gateway 108, a cellular network 110, a client computer 111, and communication devices 112A-112F. The communication devices 112 include a VoIP phone 112A, a computer 112B configured to run communications software applications (e.g. VoIP, voice, audio, video, facsimile, or data applications), a fax machine 112C, a telephone 112D, a cellular phone 112E, and a multi-mode phone 112F. It should be noted that although client computer 111 and computer 112B are shown in FIG. 1 as notebook computers, they are not limited to being notebook computers; any computing device such as a desktop computer, server, computing tablet, computing personal accessory, etc. can be considered to be a computer 112B for the purposes of the description herein.

The hosted communications provider 102 is connected to the Internet 104. Transmissions to and from the hosted communications provider 102 between the Internet 104 and the PSTN 106 pass through the PSTN-VoIP gateway 108. The PSTN 106 is also in communication with the cellular network 110.

The hosted communications provider 102 provides messaging services to its users via its connection 103 to the Internet 104. A user of the hosted communications provider 102 can initiate or receive communications from any of the communication devices 112A-112F shown in FIG. 1. The VoIP phone 112A and the computer 112B can communicate using internet protocols; they communicate with the hosted communications provider 102 through the Internet 104. The fax machine 112C and the telephone 112D are connected to the PSTN 106; their communications with the hosted communications provider 102 pass through the PSTN-VoIP gateway 108. The PSTN-VoIP gateway 108 converts packets it receives from the Internet 104 into a format compatible for transmission across the PSTN 106, such as time-division multiplexing (TDM). The PSTN-VoIP gateway 108 also converts signals received from the PSTN 106 into IP packets for transmission over the Internet 104.

The cellular phone 112E is connected to the cellular network 110; it communicates with the hosted communications provider 102 via the cellular network 110 to the PSTN 106 to the PSTN-VoIP gateway 108. The multi-mode phone 112F can communicate with the hosted communications provider 102 via either the cellular network 110 or through its own connection to the Internet 104. The number and types of communication devices 112 shown in FIG. 1 are not exhaustive, and other configurations are possible. For example, a traditional analog telephone can be connected to the Internet 104 (e.g., in place of the PSTN 106) by using an Analog Telephone Adapter (ATA).

The hosted communications provider 102 provides VoIP and other media services through its Internet connection. There are various protocols used to send real-time multimedia (including voice and video communications) over the Internet 104. Session Initiation Protocol (SIP) is one protocol used to establish, transfer, and end sessions between communication devices and the hosted communications provider 102 across the Internet 104. The SIP signaling protocol is described further in Request For Comments (RFC) 3261, entitled "SIP: Session Initiation Protocol," by J. Rosenberg et al., June 2002, published by the Internet Engineering Task Force (IETF). Real-time Transport Protocol (RTP) is another protocol used to transport multimedia data packets across the Internet. The RTP protocol is described further in RFC 3550, entitled "RTP: A Transport Protocol for Real-Time Applications," by H. Schulzrinne et al., July 2003, published by the IETF. SIP and RTP are used herein as examples of protocols for illustrative purposes only, but there are many other protocols that can be used in IP telephony including, but not limited to: the protocols defined by the International Telecommunication Union Telecommunication Standardization Sector (ITU-T) H.323 standard, and proprietary protocols such as those used by Skype® VoIP Services, of Silver Lake Partners.

A caller can use any of the communication devices 112 shown in FIG. 1 to leave a voice, fax, or text message with a user of the hosted communications provider 102. For example, a caller can use the VoIP phone 112A to leave a voicemail message for the user. (The caller may or may not be another user of the hosted communications provider 102). The caller initiates the call from the VoIP phone 112A, dialing a number associated with the user. The call is received by the hosted communications provider 102, which recognizes that the number belongs to one of its users. The caller leaves a voice message, which is received and stored by the hosted communications provider 102 for later access by the user. Similarly, a caller can use the fax 112C to send a fax message to the user, or cellular phone 112E to send a text message to the user. The voice, fax, or text message can all be received and stored by the hosted communications provider 102.

The message can reach the user in various ways. For example, the hosted communications provider 102 can email the message to the user as soon as it is received by attaching the message to the email, e.g. as an audio file in the case of voicemail, or as an image file in the case of a facsimile. The user can also use a local client computer 111 to login to the user's account at the hosted communications provider 102 to check for the availability of any messages, and to download messages as desired to the user's local client computer. This latter method is discussed in further detail below.

Figure 2:
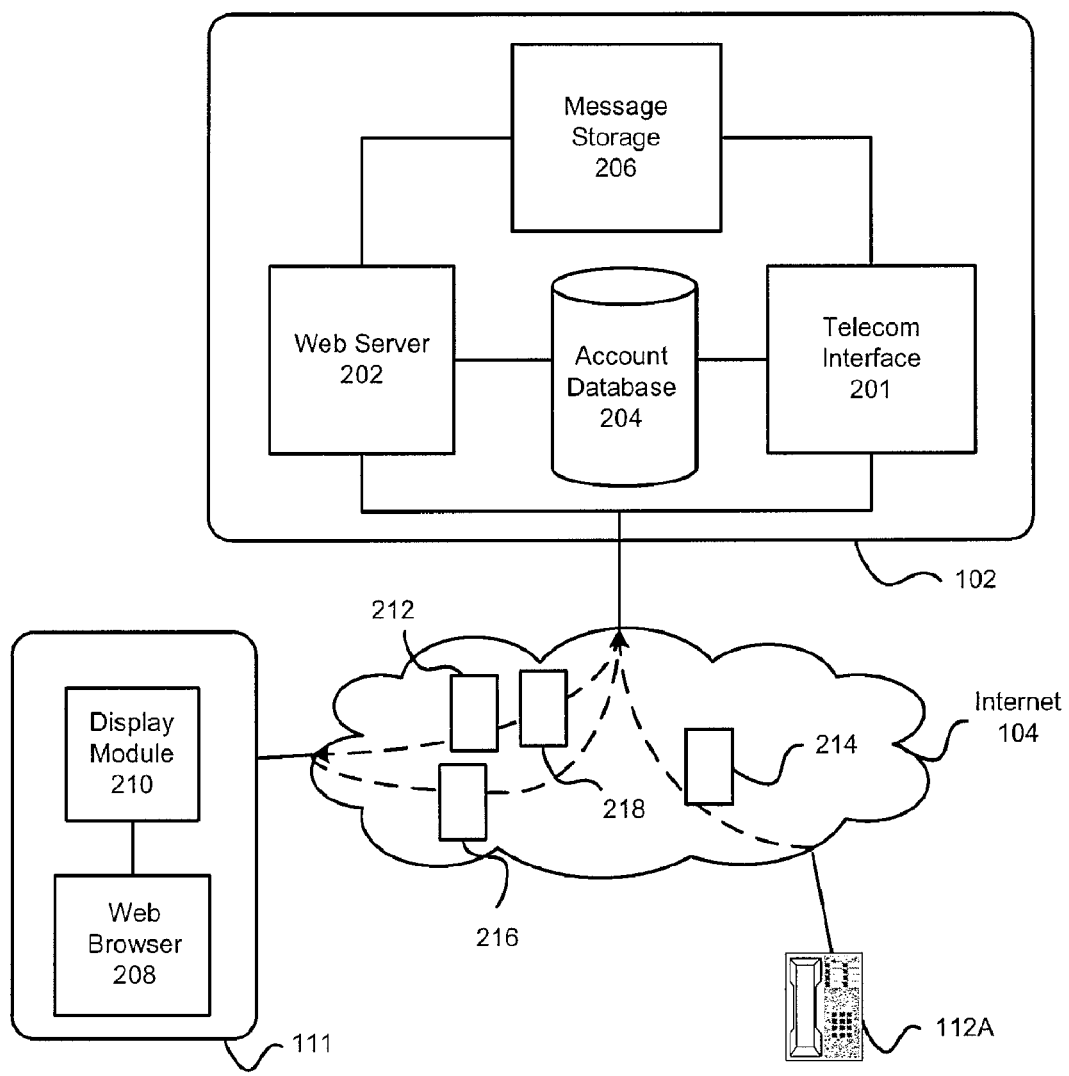
FIG. 2 shows an example of an expanded block diagram view of a client computer and a hosted communications provider as in FIG. 1.

FIG. 2 illustrates an expanded block diagram view of the client computer 111 and the hosted communications provider 102 from FIG. 1. The hosted communications provider 102 includes telecom interface module 201, web server 202, account database 204, and message storage device 206. The client computer 111 includes a web browser module 208, a display module 210 that works with the web browser module 208, and a display controller 217. The client computer 111 includes a client controller 213 which performs operations and implements computer-readable instructions stored in a memory storage unit 219.

As shown in FIG. 2, the client computer 111, the hosted communications provider 102, and the VoIP phone 112A are connected to the Internet 104. As described in the previous example, a caller can leave a message 214 for the user by calling the user's number. The call is received by the telecom interface module 201 in the hosted communications provider 102. The telecom interface module 201 verifies with the account database 204 that the number being called is associated with a valid account. After verification, the message 214 is stored in message storage device 206. As previously mentioned, the message 214 can include various formats such as voice, facsimile, text, or data. For example, a caller can use the fax machine 112C to send a fax message to the user, or cellular phone 112E to send a text message to the user. Regardless of whether the message is voice, fax, text, or data, the message 214 is received and stored in message storage device 206 by the hosted communications provider 102. As illustrated, the hosted communications provider 102 includes a controller 203 which acts to implement actions and respond to computer-readable instructions stored in the account database 204, web server 202, telecom interface 201, memory storage 206 and other modules (not shown).

Once the message 214 is stored, the user can use a local client computer 111 to log in to the user's account online to check for the availability of any messages, and to download messages as desired to the user's local client computer 111. The local client computer 111 has a web browser module 208 installed for browsing the Internet 104. The web browser module 208 displays an application window on a monitor, screen or other output display device (not shown) for the local client computer 111. To access the user's account online, the user enters an address (such as a Uniform Resource Locator, or "URL") to the web browser module 208 that points to the hosted communications provider's web server 202.

The first webpage returned by the web server 202 is typically a login page where the user provides a user name and a password to authenticate the user. The web server 202 checks that the user name and password belong to a valid account in the account database 204. Once the user is verified, the web server 202 sends a user interface 212 to the client computer 111. The user interface 212 displays account-specific information to the user, such as a list of the messages stored for the user, the account settings and preferences, and so forth. The user interface 212 is provided in a file format specific to the display module 210. The user interface 212 is interpreted by the display module 210. The display module 210 interprets the user interface 212 and displays it through the web browser module 208. Display module 210 is not a general HTML interpreter, and the user interface 212 is not in HTML. The file format of the user interface 212 is compatible with the display module 210, but is generally not compatible with the web browser module 208 as a stand-alone application without the display module 210.

Display module 210 works with the web browser module 208, but may or may not be included in the same application as the web browser module 208. For example, it can often be installed or downloaded as a separate component. Display module 210 is sometimes referred to as a "plug-in" to the web browser module 208 that extends the capabilities of the web browser module 208.

The display module 210 can be, for example, a version of the Adobe Flash Player® software, which is a cross-platform browser-based application runtime that enables viewing of expressive applications, content, and videos across screens and browsers. If the display module 210 is an Adobe Flash Player® software, then the user interface 212 would be a file compatible with Adobe Flash Player® software, such as a file in the shockwave flash, referred to as swf, file format. The format of the user interface 212 provided by the web server 202 should be compatible with the display module 210 installed on the client computer 111. Other display modules and compatible file formats for the user interface may also be used.

In some implementations, the display module 210 is a proprietary module developed by the hosted communications provider 102 and provided to its users. In some implementations, the user interface 212 is also provided in a proprietary format to be used by the display module 210. By developing its own proprietary display module 210 and user interface file format, the hosted communications provider 102 retains greater control over the appearance and functionality of the user interface 212. When the user interface 212 is designed and provided in a file format specifically intended for display module 210, more control may be retained over the appearance of the user interface 212, especially across various types of web browsers. In some implementations, the display module 210 is configured for a specified operation and the user interface 212 is configured thereto.

In some implementations, the user interface 212 is provided in two formats: an HTML format for the standard browser, and a format specific to the display module. The HTML portion of the user interface 212 is provided to maintain a basic level of compatibility with browsers without a display module 210 installed, but the display module format is the primary way of providing account information to the user, and the primary way for the user to configure, personalize, and access the user's account.

The user interface 212 provides access to messages for the user stored in the message storage device 206. This access can be in the form of links to the messages, or other display items that can be selected by the user. When a user selects a message link in the user interface 212, the display module 210 sends a request 216 back to the web server 202 for the message.

The web server 202 receives the request 216 and retrieves the requested message 218 from the message storage device 206. The web server 202 then returns the requested message 218 to the user. In some implementations, the requested message 218 can be displayed or played back directly by the display module 210 in the web browser module 208. In some implementations, the requested message 218 is downloaded to the local client computer 111 for play back or display through a separate application A user accesses messages stored in the network 102 by interfacing with the web browser module and accessing the URL associated with the user's account. The system may partition or organize users in a variety of ways, and may assign a mailbox to each user. The network will often incorporate a user authentication process, whereby the user will enter a user identifier and a password, or some other security combination. The processing involves the user requesting information stored as part of the user's account and then the user receiving the requested information, such as a message from another party, in any of a variety of formats.

Figure 3:
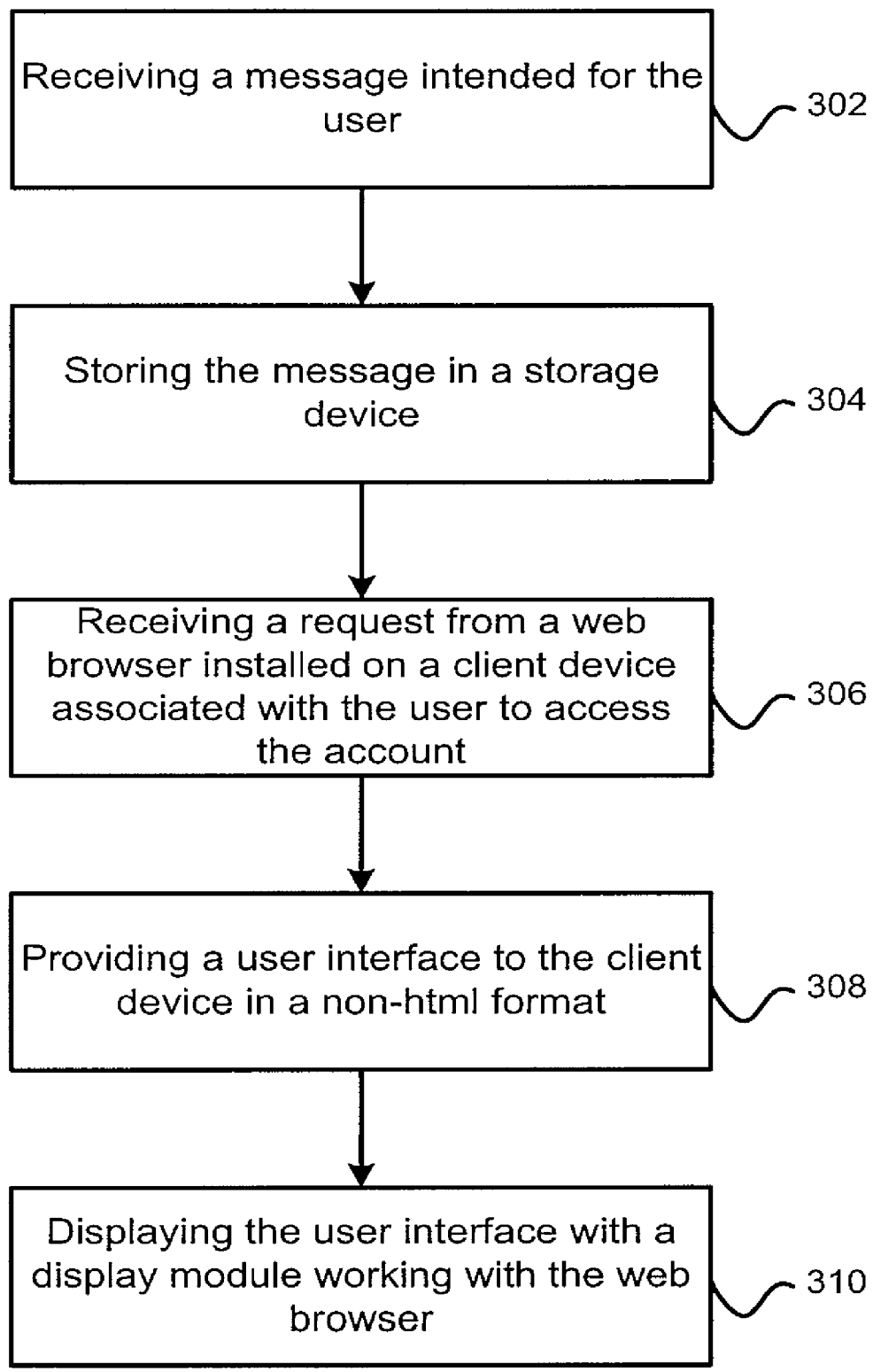
FIG. 3 is an example of a flow chart illustrating a method for accessing user messages.

FIG. 3 is an example of a flow chart illustrating a method for accessing user messages. The hosted communications provider 102 receives a communications message intended for the user, operation 302. The hosted communications provider 102 stores the communications message in a memory storage device 206, operation 304. The hosted communications provider 102 receives an access request to access the user account, operation 306. The access request is from the web browser module 208 installed on a client device associated with the user. The hosted communications provider 102 provides a user interface 212 to the client device, operation 308, wherein in one example the user interface 212 includes information associated with the user account. At least a portion of the user interface 212 is provided in a format which does not include HTML formatted code. The user's device, such as client computer 111, receives the user interface 212; and the web browser module 208 causes the user interface 212 information to display for the user.

A variety of examples are disclosed herein which provide for a messaging system, where a client device is configured to receive information for display in multiple formats, including HTML and non HTML. Where the client device is part of a hosted communication network, communications between the network and the client device are through an IP network, such as the Internet. The network receives messages and data information for the user and stores this information in a memory storage device accessible on request from the user. When the network receives an access request, the information is retrieved from the memory storage device and prepared for transmission to the client device. At least a portion of the information is prepared using a display format other than an HTML format. The information is received at the client device and displayed for the user on a display module that supports the display format.

Figure 4:
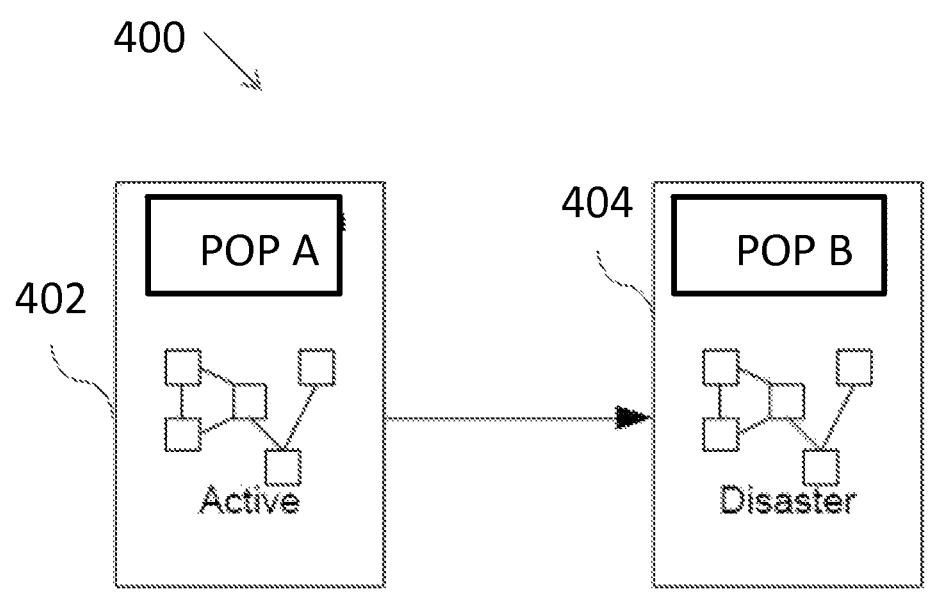
FIG. 4 is an example of a diagram of a portion of a hosted communication network.

FIG. 4 shows an example of a diagram of a portion of a hosted communication network 400, such as network 102 of FIG. 1, where the network 400 includes two Points of Presence (POP) units, 402 and 404. Each POP unit includes a server and configuration to process communications with the users supported therefrom. Each POP unit includes a configuration for routing calls to the user. The POP units are provided in pairs, where a first POP A 402 is active and a second POP B 404 is redundant and dynamic. During operation, the POP A 402 handles all the call routing, and provides updates to call logs and user preferences to store in POP B 404. As indicated, the flow of information is in one direction. As the active POP is the operational unit processing communications and updating call logs and other information which is stored in the database or memory storage unit. The stored information includes call history and other user specifics. The redundancy allows for system recovery and backup, however, such disaster recovery may take several hours to implement if there is an actual failure of the active POP A 402.

Figure 5:
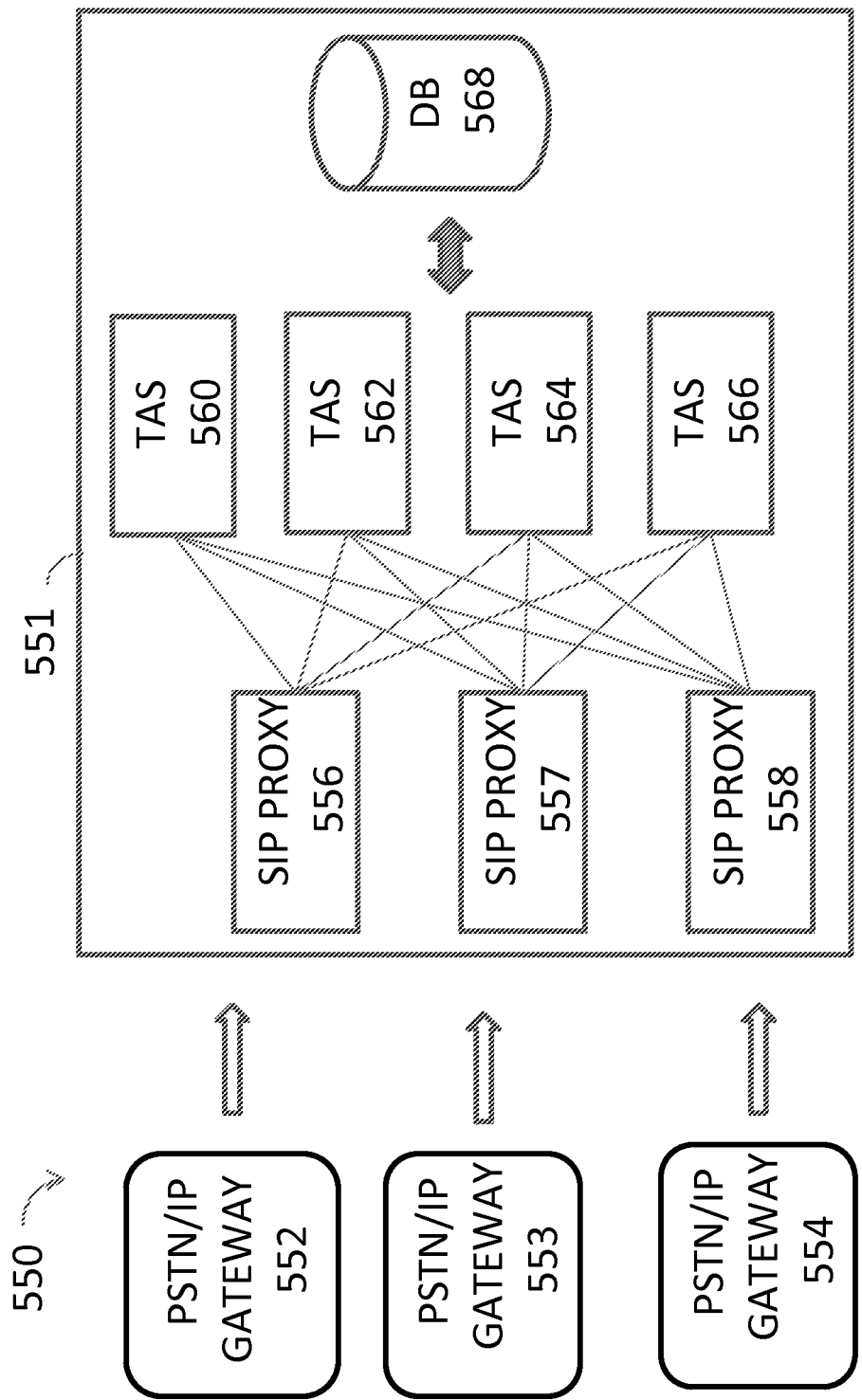
FIG. 5 shows an example of a system incorporating a network coupled to PSTN/IP gateways.

FIG. 5 illustrates an example of a system 550 incorporating the network 551, wherein the network 551 is coupled to PSTN/IP gateways 552, 553, 554. The system 550 has two POPs and is split into active and disaster portion. The two portions are considers units, and are operated so as to duplicate copies or twins. Each POP has a twin, where one twin runs is an Active Mode, while the other twin may be in a Disaster Mode or Stand-by Mode. In some implementations, the network 551 is configured to couple to multiple gateways, such as gateway 554, wherein each gateway may couple to a different service provider or type of service. For communications with users supported by the network 551, the gateway 552 receives signals from circuit-switched networks and telecommunication networks, such as PSTN or a telephone company, and is also coupled to an IP network. The gateway 552 provides an interface allowing VoIP calls to be routed from a hosted communication system to a traditional telephone network. The network 551 includes multiple SIP proxy units 556, 557 and 558, each of which routes calls to Telephone Application Server (TAS) units 560, 562, 564 and 566. Each SIP proxy unit balances traffic among the TAS units. The TAS units each receive information from the database (DB) 568, which stores user information including preferences, call processing instructions, and other user-specific information. The TAS units are smart routers, which not only direct calls throughout the network 551 but are also capable of applying rules and implementing call processing rules. For example, the TAS unit may retrieve information about a given user as to default device. Each TAS unit acts as a POP, where pairs of POPs provide for an active POP and a disaster POP as discussed hereinabove. The system 550 provides a flexible, adaptive system for handing multiple users and interfacing with a variety of telecommunications companies and gateways. Performance and capacity of the system 550, however, is limited by the database structure.

Figure 6:
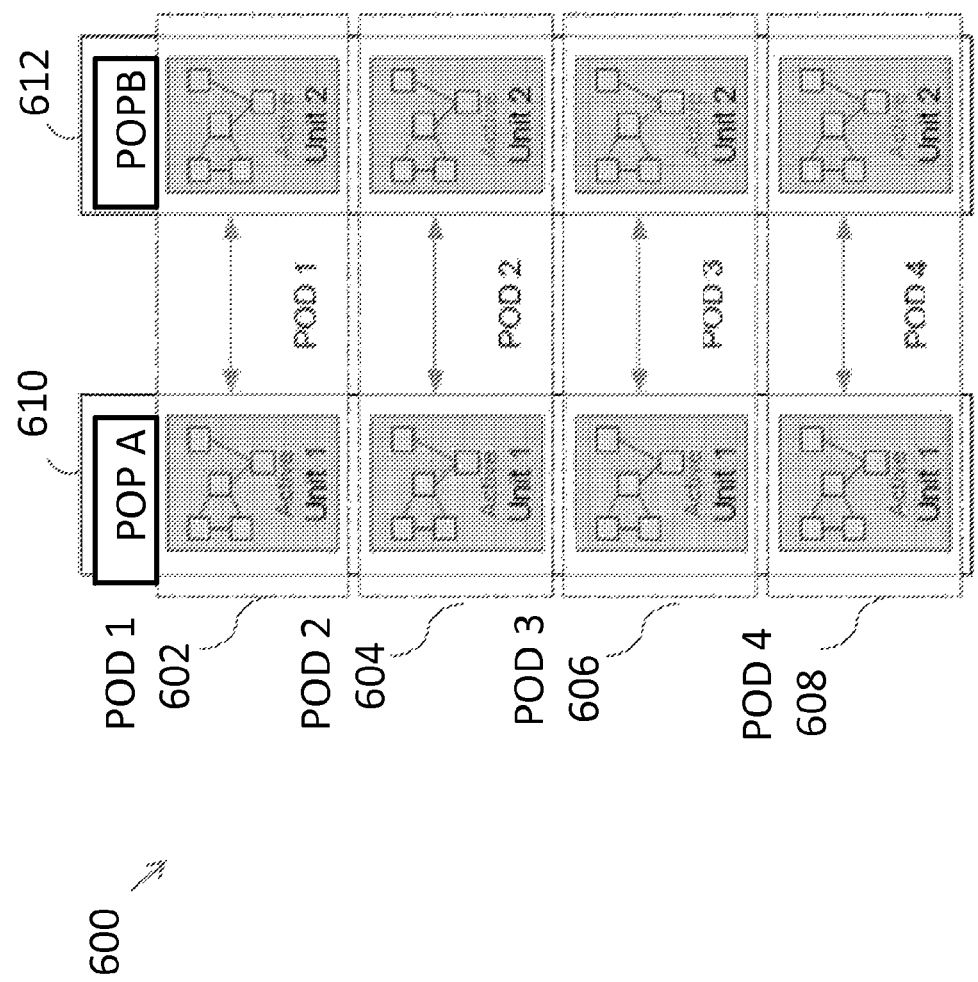
FIG. 6 shows such an example of a system that includes several pairs of Point-of Presence (POP) units.

To improve the performance of the hosted communication system, multiple active POPs can be provided. FIG. 6 illustrates an example of a system 600 that includes several pairs of POPs that are both active units. Each pair of active POPs makes up a Part of Data (POD) module. POP A 610 includes a unit 1 in each of PODs 2, 604, 606 and 608; and POP B 612 includes a unit 2 in each of PODs 602, 604, 606 and 608. In this way, the unit 1 and unit 2 create a pair. To identify a particular unit of a POD, each POP is referred to as a unit, wherein POP A of POD 602 may be referred to as P1, U1; and POP B of POD 602 may be referred to as P1, U2. The bi-directional arrow(s) between PODs indicates that both are active and operational, and the PODs share information during operation, such as call log updates.

Figure 7:
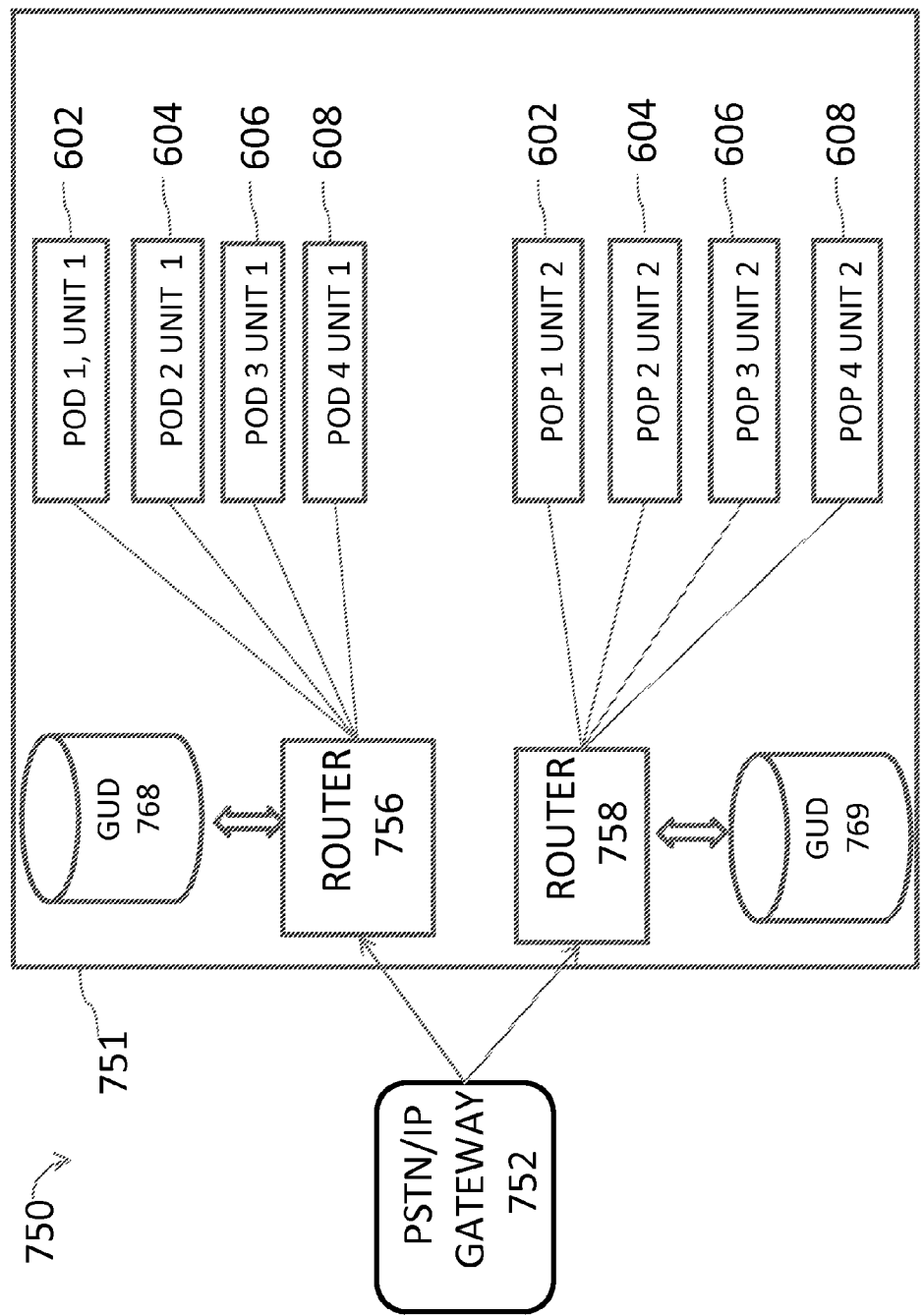
FIG. 7 shows an example of a network that includes routers and Session Initiation Protocol (SIP) proxy units with added functionality to identify a POD associated with a user to a communication.

The configuration of system 400 may be used in a system 750 illustrated in FIG. 7, which includes a hosted communication network 751. Various sources may communicate with the network 751 through gateways, such as PSTN/IP gateway 752, which each may be coupled to a different telephone company or other communication source. The gateways provide the digitized signals to the network 751. To process these digitized signals, the network 751 includes routers 756, 758, which can be SIP proxy units with added functionality to identify the POD associated with a user to a communication. The routers 756, 758 are based on a SIP proxy unit for processing telecommunication signals, and is enhanced to provide routing capabilities based on user information stored in a Global User Data (GUD) 1145 data or memory storage unit. Unlike the use of the SIP proxy unit for traffic and load balancing, the enhanced routers 756, 758, identify the location of the network user to a communication and the associated POD unit. The routers 756, 758 obtain this information from the GUD 768, 769, respectfully, which each stores information mapping each user telephone number to the POD supporting the user.

In some implementations, when a call is received at the routers 756, 758, the routers 756, 758, the GUDs 768, 769 information is used to identify the POD to which the calls are to be routed to reach the user. The GUDs 768, 769 may be any of a variety of memory storage devices. In some implementations, the GUDs 768, 769 may include additional information relating to a user. The configuration allows for double or twin active routing paths, where both routers 756, 758 are active. In this way, if either of routers 756, 758 has an operational problem, or it is desired or needed to stop operation for any period of time or to replace hardware, the other active router is available so that any impact on user experience may be minimized.

In some implementations, any number of duplicated router devices for various other configurations can be implemented. Also, in some implementations, other network components can be added between the gateway 752 and the routers 756, 758 in other implementations. Each of the routers 756, 758 may be located in different geographical locations or may be co-located in one place. The routers 756, 758 may be individual servers or may be partitions of a same server. Similarly, each of routers 756, 758 may be configured using multiple servers, such as in a server bank. In some implementations, each router may be an individual server.

Figure 8:
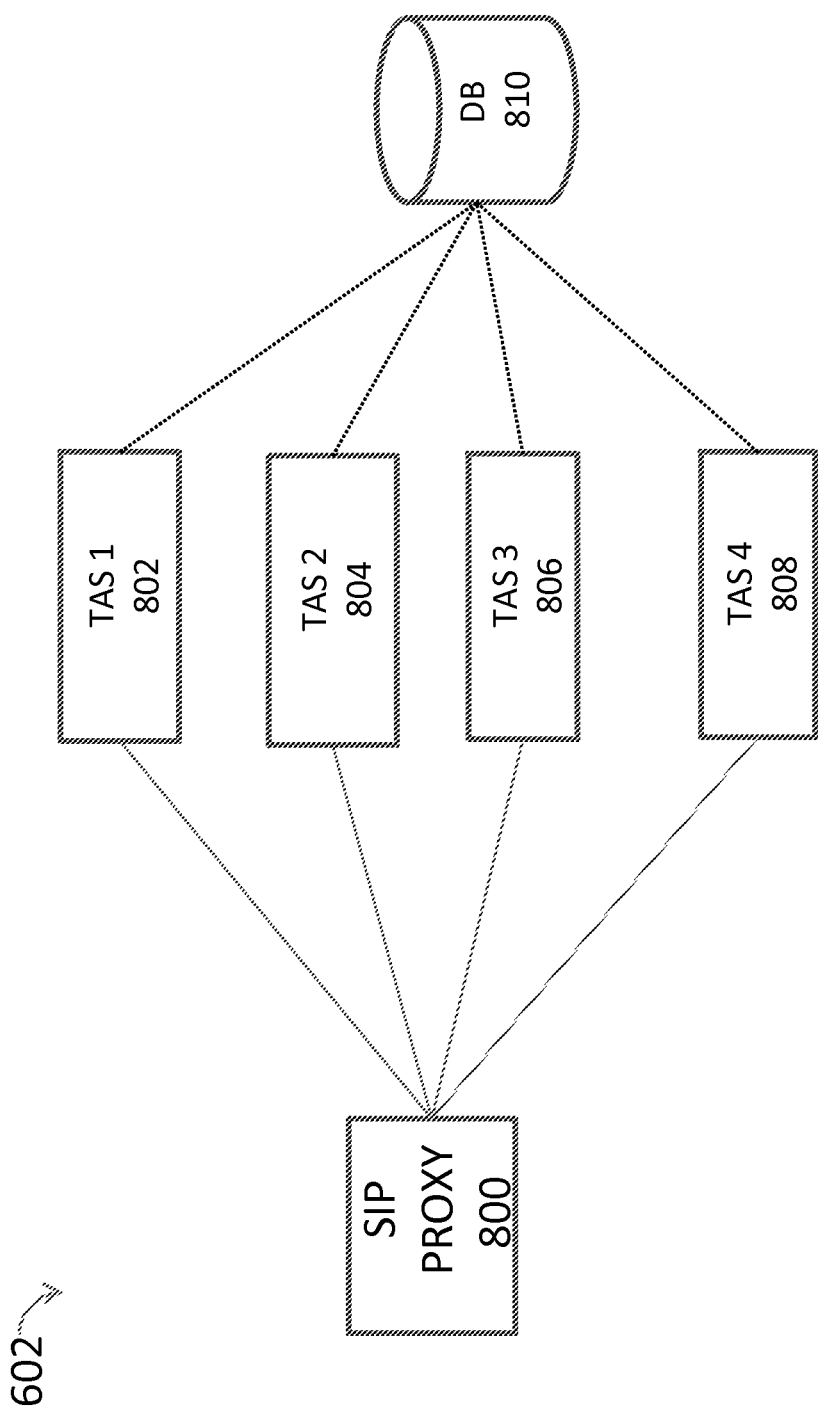
FIG. 8 shows an example of a Part of Data (POD) module.

FIG. 8 illustrates an example of a POD module, such as POD 602 of FIG. 6. The routers 756, 758 include a SIP proxy module 800, which is configured to support the SIP protocol for telecommunication, and Traffic Application Servers (TASs) 802, 804, 806, 808, which are used to interface with user devices (not shown). The TAS is a server having computing capabilities and interfaces with a database (DB) 810. The DB 810 stores user-specific information used in operation of the network and user device. The user-specific information may be in the form of data formatted for use by the TAS and user device. The user-specific information may be in the form of computer-readable instructions used by or in coordination with the TAS to service the user device. The user-specific information may indicate an order of user devices to contact for an in-coming call, such as to first route a call or transmission to a desk phone and then to a cell phone. The user may specify the user-specific information, such as during system set-up or on the fly. The user-specific information may be set by a network administrator, set by default, or set by the user. The user-specific information may store personal preferences, ringtones, messages, responses, on-hold instructions, and any of a variety of options available in the network. By routing the call to the POD supporting a specific user, the POD then contains sufficient information to process the communication to that specific user. The DB may be updated and the information made available to each TAS within a POD.

While FIG. 8 shows a portion of the POD 602 that includes unit 1, in some implementations, the unit 2 of POD 602 can be a duplicate of unit 1. In some implementations, any number of TAS units also can be implemented. The SIP proxy module 800 operates to balance traffic and is in the network. The SIP proxy module 800 has access to the status of each TAS and therefore assigns a TAS to a communication based on the status information. Such implementations may process communications in a variety of ways. When a communication, including voice calls and messages, are received at the routers the network may provide various routing schemes.

Figure 9:
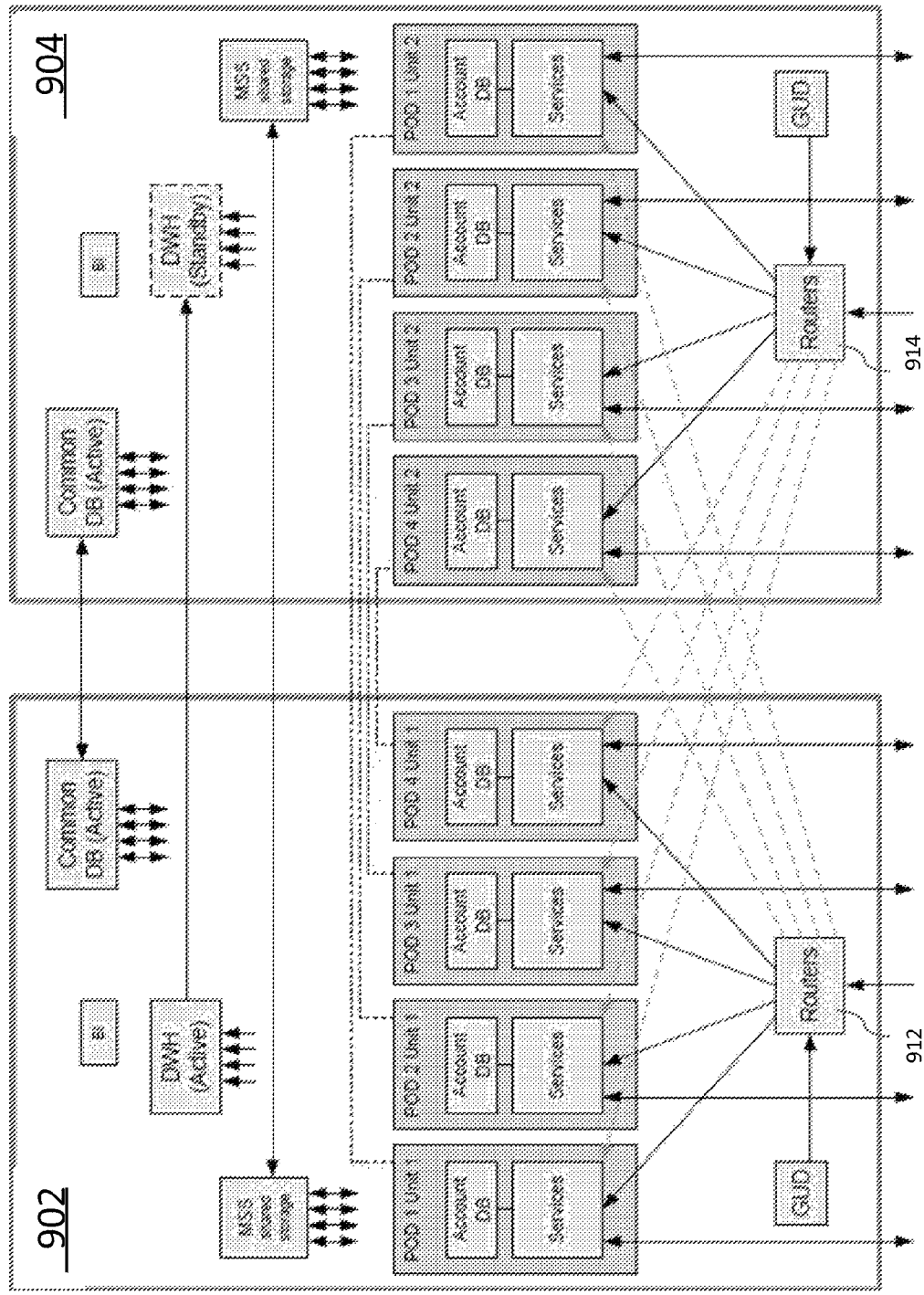
FIG. 9 shows an example of two POD modules with respective routers receiving a communication and process the communication by two paths involving multiple POPs.

FIG. 9 shows an example of two POPs having a respective router 912/914, where routers 912, 914 receive a communication and process the communication by two paths involving multiple POPs. Calls are handled by a given POD, such as POD 1, which has a portion in multiple POPS (e.g., POP 1 902 and POP 2 904). The portion of POD 1 in POP 1 902 is unit 1, and the portion of POD 1 in POP 2 904 is unit 2. Data and update information is stored in both POP 1 902 and POP 2 904. The routers 912, 914 are each coupled to individual GUDs storing the same mapping information, which maps an user identifier to a user device. The routers 912, 914 support the SIP proxy protocols, while using the mapping information from the GUD to route calls. The routers 912, 914 are each coupled to multiple TAS modules for processing communications. Each TAS module is coupled to a data base storing user-specific information.

Figure 10:
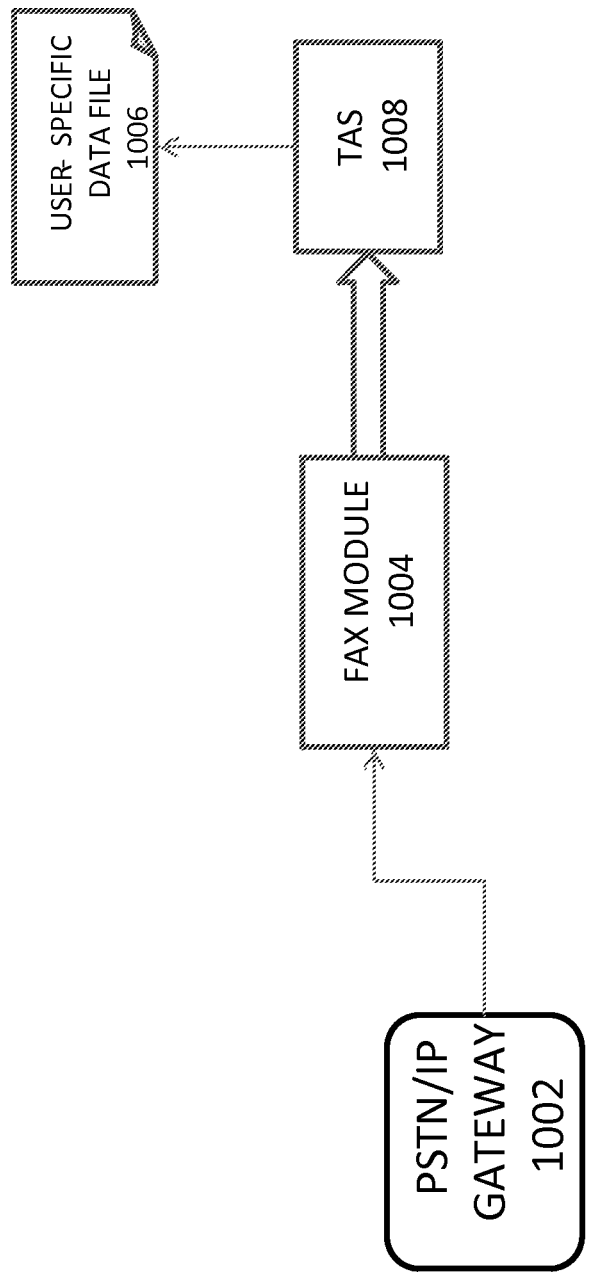
FIG. 10 shows an example of a PSTN/IP gateway coupled to a fax module.

FIG. 10 shows an example of a PSTN/IP gateway 1002 coupled to a fax module 1004. As shown in FIG. 10, the PSTN/IP gateway 1002 can generate and transmit fax information to the fax module 1004. The fax information is received from the gateway 1002 at the fax module 1004 (which also can be configured to receive data in other formats in addition to fax data). The fax module 1004 forwards a notification to the user device through the TAS 1008 serving the user device. In some implementations, the fax module 1004 receives the data, converts the data into a designated format, and stores the formatted data for retrieval by the user of the user device. In some implementations, the formatted data can be stored in user data file 1006, which is accessible from one or more access media, such as email, mobile device interface, and the like. In some implementations, the data file 1006 is updated at both active POPs in a pair. In some implementations, the data file 1006 stored is stored at only one POP. In some implementations, the data file 1006 is stored in a central location accessible by users from various devices.

As presented herein, a hosted network expands coverage while guarding against server failures by providing duplicate POPs, which defines a POD as having one unit in each POP. Such application enables a SIP proxy router in each POP to access GUD information so as to route calls appropriately. The duplication allows either POP to operate independently in case of a failure of the other unit.

Although the present invention has been described in detail with reference to particular embodiments, persons possessing ordinary skill in the art to which this invention pertains will appreciate that various modifications and enhancements may be made.

Figure 11:
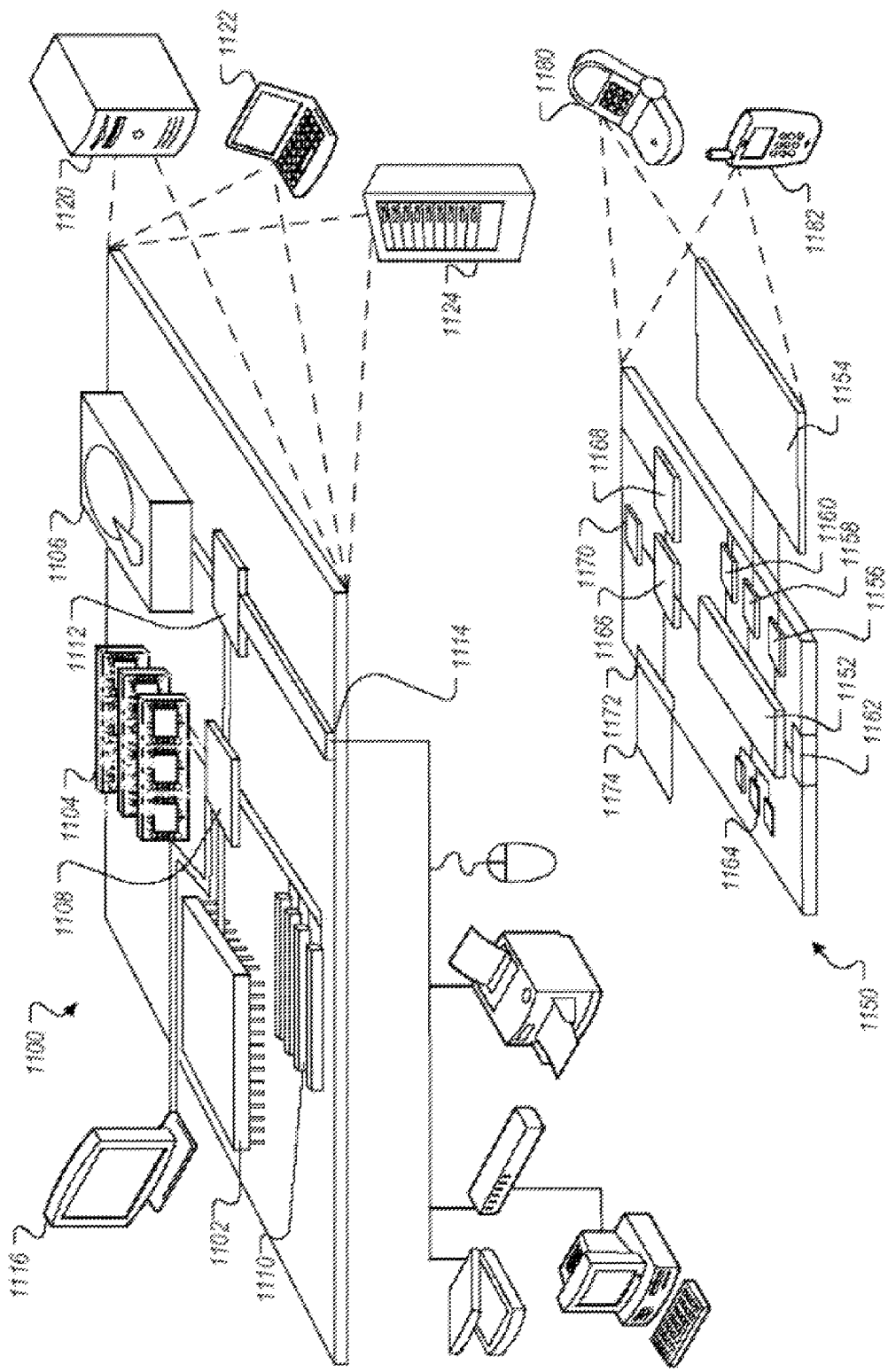
FIG. 11 is a block diagram of computing devices that may be used to implement the systems and methods described herein.

FIG. 11 is a block diagram of computing devices 1100, 1150 that may be used to implement the systems and methods described in this document, as either a client or as a server or plurality of servers. Computing device 1100 is intended to represent various forms of digital computers, such as laptops, desktops, workstations, personal digital assistants, servers, blade servers, mainframes, and other appropriate computers. Computing device 1150 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1100 includes a processor 1102, memory 1104, a storage device 1106, a high-speed interface 1108 connecting to memory 1104 and high-speed expansion ports 1110, and a low speed interface 1112 connecting to low speed bus 1114 and storage device 1106. Each of the components 1102, 1104, 1106, 1108, 1110, and 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as display 1116 coupled to high speed interface 1108. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a computer-readable medium. In one implementation, the memory 1104 is a volatile memory unit or units. In another implementation, the memory 1104 is a non-volatile memory unit or units.

The storage device 1106 is capable of providing mass storage for the computing device 1100. In one implementation, the storage device 1106 is a computer-readable medium. In various different implementations, the storage device 1106 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 1104, the storage device 1106, or memory on processor 1102.

The high speed controller 1108 manages bandwidth-intensive operations for the computing device 1100, while the low speed controller 1112 manages lower bandwidth-intensive operations. Such allocation of duties is exemplary only. In one implementation, the high-speed controller 1108 is coupled to memory 1104, display 1116 (e.g., through a graphics processor or accelerator), and to high-speed expansion ports 1110, which may accept various expansion cards (not shown). In the implementation, low-speed controller 1112 is coupled to storage device 1106 and low-speed expansion port 1114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. It may also be implemented as part of a rack server system 1124. In addition, it may be implemented in a personal computer such as a laptop computer 1122. Alternatively, components from computing device 1100 may be combined with other components in a mobile device (not shown), such as device 1150. Each of such devices may contain one or more of computing device 1100, 1150, and an entire system may be made up of multiple computing devices 1100, 1150 communicating with each other.

Computing device 1150 includes a processor 1152, memory 1164, an input/output device such as a display 1154, a communication interface 1166, and a transceiver 1168, among other components. The device 1150 may also be provided with a storage device, such as a microdrive or other device, to provide additional storage. Each of the components 1150, 1152, 1164, 1154, 1166, and 1168, are interconnected using various buses, and several of the components may be mounted on a common motherboard or in other manners as appropriate.

The processor 1152 can process instructions for execution within the computing device 1150, including instructions stored in the memory 1164. The processor may also include separate analog and digital processors. The processor may provide, for example, for coordination of the other components of the device 1150, such as control of user interfaces, applications run by device 1150, and wireless communication by device 1150.

Processor 1152 may communicate with a user through control interface 1158 and display interface 1156 coupled to a display 1154. The display 1154 may be, for example, a TFT LCD display or an OLED display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may be provide in communication with processor 1152, so as to enable near area communication of device 1150 with other devices. External interface 1162 may provide, for example, for wired communication (e.g., via a docking procedure) or for wireless communication (e.g., via Bluetooth or other such technologies).

The memory 1164 stores information within the computing device 1150. In one implementation, the memory 1164 is a computer-readable medium. In one implementation, the memory 1164 is a volatile memory unit or units. In another implementation, the memory 1164 is a non-volatile memory unit or units. Expansion memory 1174 may also be provided and connected to device 1150 through expansion interface 1172, which may include, for example, a SIMM card interface. Such expansion memory 1174 may provide extra storage space for device 1150, or may also store applications or other information for device 1150. Specifically, expansion memory 1174 may include instructions to carry out or supplement the processes described above, and may include secure information also. Thus, for example, expansion memory 1174 may be provide as a security module for device 1150, and may be programmed with instructions that permit secure use of device 1150. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1164, expansion memory 1174, or memory on processor 1152.

Device 1150 may communicate wirelessly through communication interface 1166, which may include digital signal processing circuitry where necessary. Communication interface 1166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1168. In addition, short-range communication may occur, such as using a Bluetooth, WiFi, or other such transceiver (not shown). In addition, GPS receiver module 1170 may provide additional wireless data to device 1150, which may be used as appropriate by applications running on device 1150.

Device 1150 may also communication audibly using audio codec 1160, which may receive spoken information from a user and convert it to usable digital information. Audio codex 1160 may likewise generate audible sound for a user, such as through a speaker, e.g., in a handset of device 1150. Such sound may include sound from voice telephone calls, may include recorded sound (e.g., voice messages, music files, etc.) and may also include sound generated by applications operating on device 1150.

The computing device 1150 may be implemented in a number of different forms, as shown in the figure. For example, it may be implemented as a cellular telephone 1180. It may also be implemented as part of a smartphone 1182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product (e.g., non-transitory), apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As described herein, is a method for a user of a hosted communications provider to access an account associated with the user, comprising: receiving a message intended for the user of the hosted communications provider; storing the message in a storage device; receiving a request from a web browser installed on a client device associated with the user to access the account; providing a user interface to the client device having information associated with the user account, the information including access to the message, wherein the information is provided in a file format other than hyper text markup language (HTML); receiving a request from the client device for the message; and providing the message to the client device.

Also described herein, the above method, wherein at least a portion of the user interface is provided in a format compatible with a flash player, wherein the file format is for use by a display module working with the web browser installed on the client device, and is incompatible with the web browser, wherein the user interface is in a proprietary format developed by the hosted communications provider, wherein the display module is a proprietary module developed by the hosted communications provider, wherein the display module is a plug-in to the web browser, wherein the user interface includes one or more links to the user's messages in the storage device, and wherein receiving a request from a web browser includes receiving the request from the web browser at a web server, the method further comprising returning a requested message to the user for display by the display module.

As described herein, is a hosted communications provider system, comprising: a controller for processing operations; a memory storage device coupled to the controller, the memory storage device storing messages for users of a hosted communication provider; and an interface coupled to the controller and configured to process Internet Protocol (IP) communications and prepare messages in a display format other than an HTML format.

Also described herein, the above hosted communications provider system, further comprising: a web server coupled to the controller and configured to process Internet Protocol communications, wherein the web server is further configured to prepare messages in an HTML display format, wherein the interface prepares and transmits a first message to a first user in response to an access request, wherein the controller initiates retrieval of the first message from the memory storage device in response to the access request, further comprising an account database, wherein the account database stores information specific to the first user, and the information is configured to authorize the access request, wherein first message is received from a second user, wherein the first message is a Short Message Service (SMS) message.

As described herein, is a client communications system, comprising: a client controller for processing operations in coordination with a hosted communications provider; a display module coupled to the client controller, the display module configured to display information using a display format other than HTML; and a web browser module coupled to the display module and for preparing information in an HTML display format.

Also described herein, the above client communications system, further comprising a display controller coupled to the display module, and configured to initiate display of the information in the display format, wherein the apparatus receives a message from the hosted communications provider and displays the message on the display module, further comprising: a memory storage unit configured to store computer-readable instructions to: send an access request to the hosted communications provider; receive a message in response to the access request, the message from the hosted communications provider and received via an Internet Protocol (IP) network; identify the display format of the message; and instruct the display controller to display the message using the display format on the display module.

As described herein, is a hosted communications provider or network supports communications to multiple users, each having associated accounts. The network includes memory storage device(s) for storing communications message(s) directed to one or more of the users. A web server module is configured to receive access requests for the user accounts; such requests originating from a user device. The network provides the requested access and sends the information using a non HTML format for at least a portion of the information. The user device displays the requested information on a display device. In some implementations, the information is sent to the user in a non-HTML format. In some implementations, at least a portion of the user interface is provided in a file format which does not include HTML.

Figure 12:
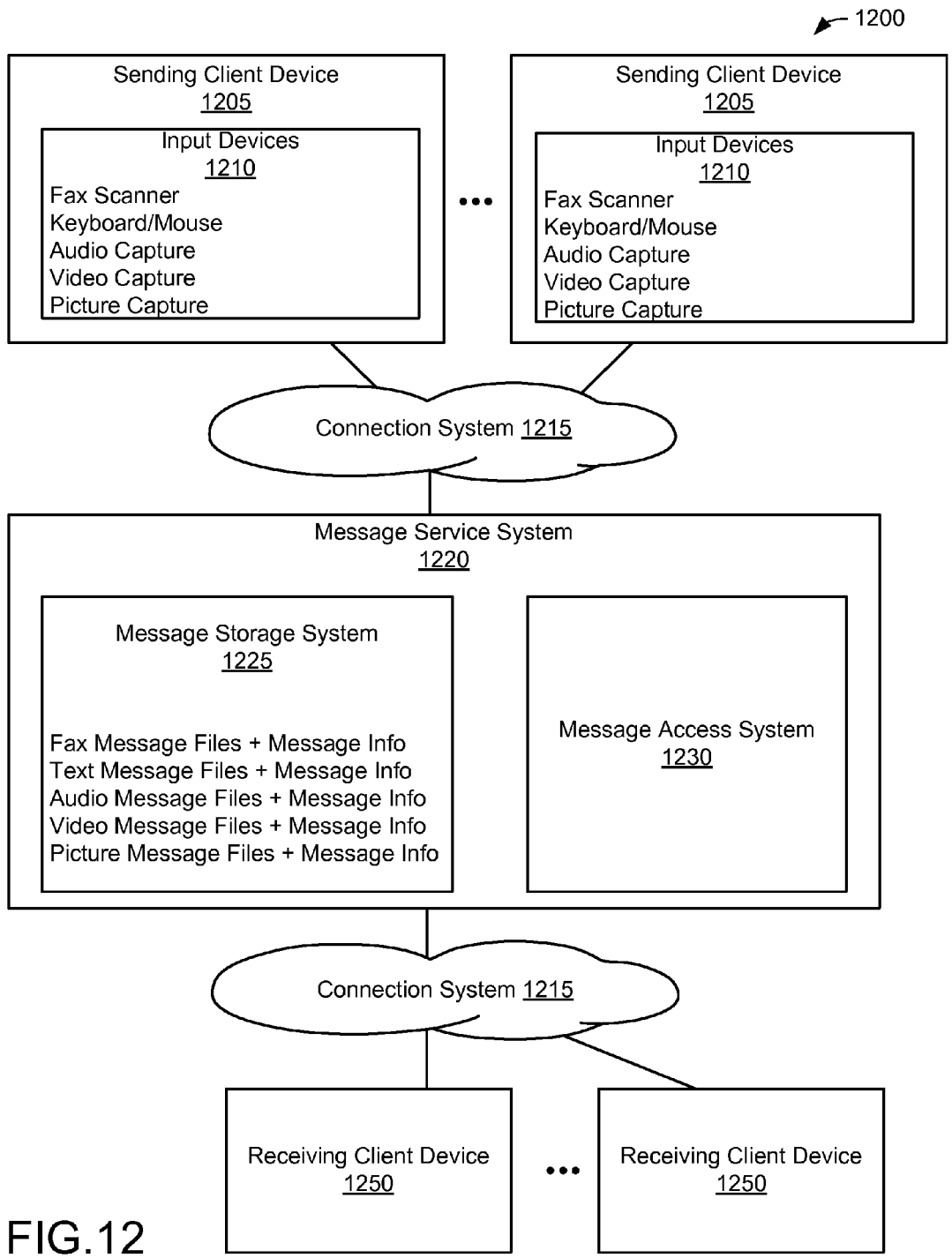
FIG. 12 is a block diagram of an exemplary message environment in which some embodiments operate.

III. Message Environment, Message Service System, and Message UI for Accessing Messages FIG. 12 is a block diagram of an exemplary message environment 1200 in which some embodiments operate. The environment 1200 comprises a plurality of sending client devices 1205, a connection system 1215, a message service system 1220 (comprising a message storage system 1225 and a message access system 1230), and a plurality of receiving client devices 1250.

The sending client devices 1205 may be coupled to the message service system 1220 through a connection system 1215. Likewise, the receiving client devices 1250 may be coupled to the message service system 1220 through a connection system 1215. Each sending client device 1205 may send messages to intended recipients through the connection system 1215. The messages may be routed through the connection system 1215 to the message service system 1220.

The sending client device 1205 may comprise any variety of devices capable of sending a message. For example, a sending client device 1205 may comprise any communication device 112 shown in FIG. 1, such as VoIP phone 112A, a computer 112B configured to run communications software applications (e.g. VoIP, voice, audio, video, facsimile, or data applications), a fax machine 112C, a telephone 112D, a cellular phone 112E, and a multimode phone 112F. It should be noted that although computer 112B are shown in FIG. 1 as a notebook computer, it is not limited to being a notebook computer; any computing device such as a desktop computer, server, computing tablet, computing personal accessory, etc. can be considered to be a computer 112B for the purposes of the description herein.

As shown in FIG. 12, a sending client device 1205 may comprise various input devices 1210 for producing various types of messages. An input device 1210 may be of any type that allows the sender to provide input into the sending client device 1205 for producing a message. For example, the input devices 1210 may include a fax scanner device for producing fax messages, a keyboard and/or mouse for producing text messages, a voice/audio capture device for producing voice/audio messages, a video capture device for producing video messages, and a picture capture device (camera) for producing picture messages. An input device 1210 may also comprise a device for inputting user selections and text, such as a mouse, trackball, keyboard, etc.

Each sending client device 1205 may further comprise various computer hardware components configured for implementing embodiments described herein. For example, a sending client device 1205 may comprise a computing device 1100 or a mobile computing device 1150 shown in FIG. 11. The sending client device 1205 may include the various computer hardware components (e.g., processor 1102, memory 1104, storage device 1106) of the computing devices 1100 or 1150 that are configured for implementing embodiments described herein. These computer hardware components are described in relation to FIG. 11 and are not discussed in detail here.

Each sending client device 1205 may send messages that sent through the connection system 1215 to the message service system 1220. The connection system 1215 may comprise various computer networks, telephone networks, cellular networks, and communication devices for connecting a sending client device 1205 to the message service system 1220. For example, the connection system 1215 may comprise the packet switched network (such as the Internet) 104, the public switched telephone network (PSTN) 106, the PSTN-VoIP gateway 108, and the cellular network 110 shown in FIG. 1. These connection system 1215 components are described in relation to FIG. 1 and are not discussed in detail here. For the purposes of illustrating the connection system 1215 between the sending client device 1205 and the message service system 1220, the sending client device 1205 may comprise any communication device 112 shown in FIG. 1 and the message service system 1220 may comprise the hosted communications provider 102 shown in FIG. 1.

The messages, from the sending client devices 1205, are received by the message service system 1220 and stored to the message storage system 1225. Each received message may be stored as a digital message file in a particular format type. The message files may comprise a plurality of different message types converted to a plurality of different format types. In the example shown in FIG. 12, the message storage system 1225 may store fax message files, text message files, voice/audio message files, video message files, picture message files, or any combination thereof.

Examples of different format types for fax message files include Portable Document Format (PDF), Flexible Image Transport System (FITS), Tagged Image File Format (TIFF), etc. Examples of different format types for text message files include Plain Text, PDF, .doc, etc. Examples of different format types for voice/audio message files include WAV, MP3, MP4, AIFF (IFF file format), Extensible Music Format (XMF), etc. Examples of different format types for video message files include 3GP, AVI, Flash Video (FLV, F4V), QuickTime File Format, MP4, RealMedia (RM), etc. Examples of different format types for picture message files include Joint Photographic Experts Group (JPEG), TIFF, Portable Network Graphics (PNG), etc.

With each message file, the message service system 1220 may also produce and store message information describing the message file, such as a size of the message (e.g., time length of the message, number of pages of the message), identifier for the sending client device (e.g., phone number and/or sender name), the message type (fax, text, audio, etc.), the date and time the message was received, etc. The message information may be stored along with the associated message file in the message storage system 1220 and transmitted to various components along with the associated message file or may be separately transmitted to various components. Preferably, the message information is formatted in a non-markup language, such as comma-delimited format.

As shown in FIG. 12, the exemplary message environment 1200 also includes a plurality of receiving client devices 1250 coupled to the message service system 1220 through the connection system 1215. A receiving client device 1250 is used by an intended recipient ("user") of a message. A receiving client device 1250 may comprise any variety of devices capable of accessing messages. For example, a receiving client device 1250 may comprise a computer 111 or mobile device (e.g., cellular phone 112E, multimode phone 112F, smartphone, etc.).

The message access system 1230 of the message service system 1220 interacts with the receiving client devices 1250 to provide access to messages and associated message information stored on the message storage system 1225. A receiving client device 1250 provides a Flash UI that interacts with the message access system 1230 to access messages and associated message information, as described below in Section III.

A. Message Access System and Receiving Client Device

Figure 13:
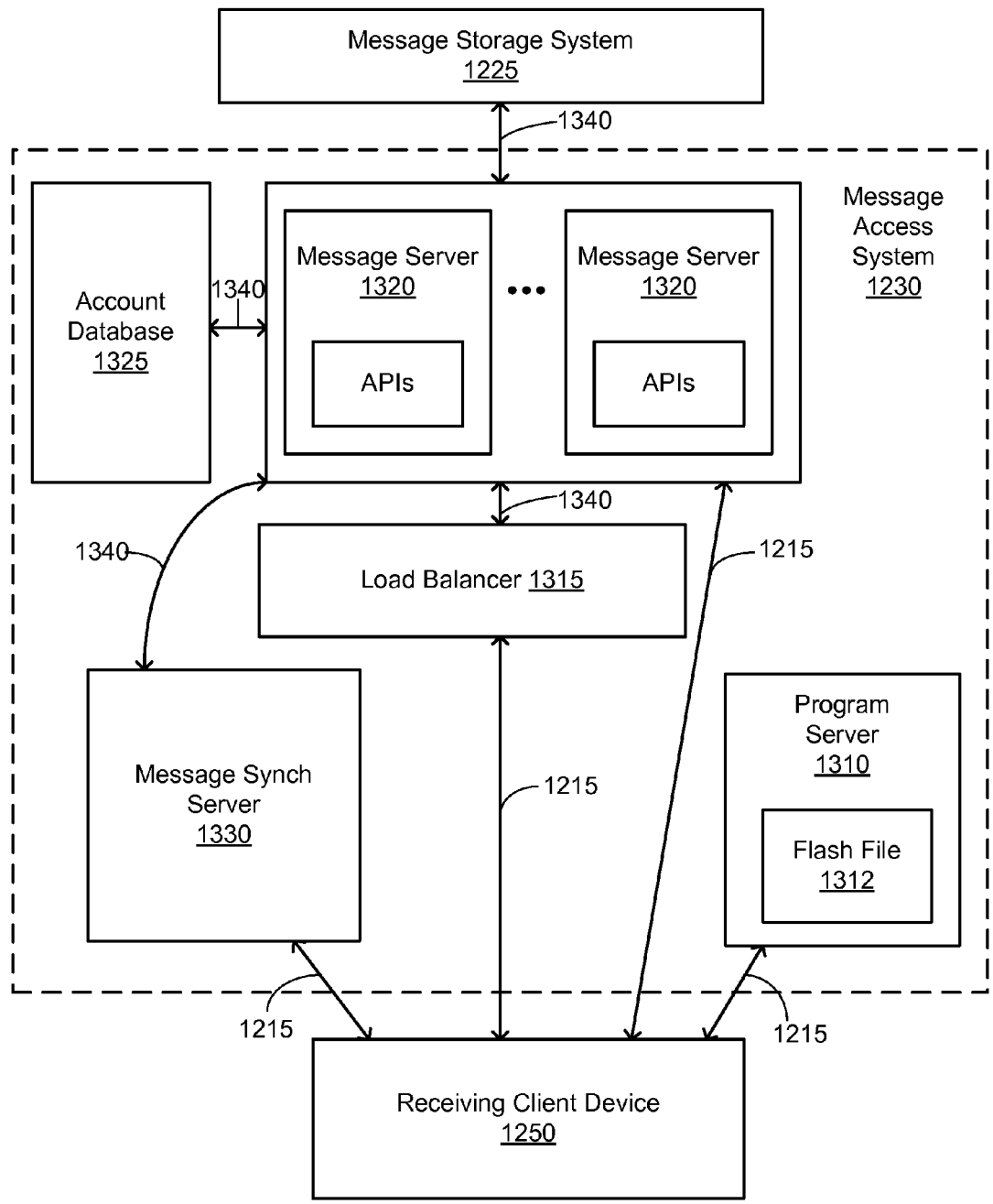
FIG. 13 is a conceptual diagram showing components and interactions of an exemplary message access system in which some embodiments operate.

FIG. 13 is a conceptual diagram showing components and interactions of an exemplary message access system 1230 in which some embodiments operate. In some embodiments, the message access system 1230 comprises at least one program server 1310, at least one load balancer 1315, at least one message server 1320, at least one account database server 1325, and at least one message synchronization server 1330. The account database server 1325 may comprise a dedicated server or may be integrated with another server, such as a program server 1310 or a message server 1320.

A receiving client device 1250 may be connected to the program server 1310, load balancer device 1315, message server 1320, and message synchronization server 1330 through the connection system 1215. The various components of the message access system 1230 and the message storage system 1225 may be interconnected through a computer network 1340, such as a point-to-point link, shared local area network (LAN), wide area network (WAN), or virtual private network (VPN) implemented over a public network such as the Internet.

In some embodiments, the message access system 1230 comprises two different servers: a program server 1310 and a message server 1320 having different functions. In other embodiments, the functions of the program server 1310 and message server 1320 are combined into a single server. Each server may comprise a computer system (having hardware and software) in a network that is shared by multiple users. The program server 1310 may store a Flash media UI file (shown as Flash media UI file 1312) that is transmitted to a receiving client device 1250. Each receiving client device 1250 may download/receive and install the Flash media UI file 1312 from the program server 1310. Once installed, the Flash media UI file 1312 may provide a Flash UI engine on the receiving client device 1250.

Preferably, the Flash media UI file 1312 comprises only Flash® programming instructions. The Flash media UI file 1312 may comprise Flash® programming instructions for configuring a message UI and a settings UI, and also comprises a one or more embedded applications for performing various functions when executed, as described herein. Preferably, the Flash media UI file is in the Small Web Format (SWF) format as a .swf file. The Flash UI engine executes the Flash media UI file 1312 to perform embodiments herein.

Figure 14:
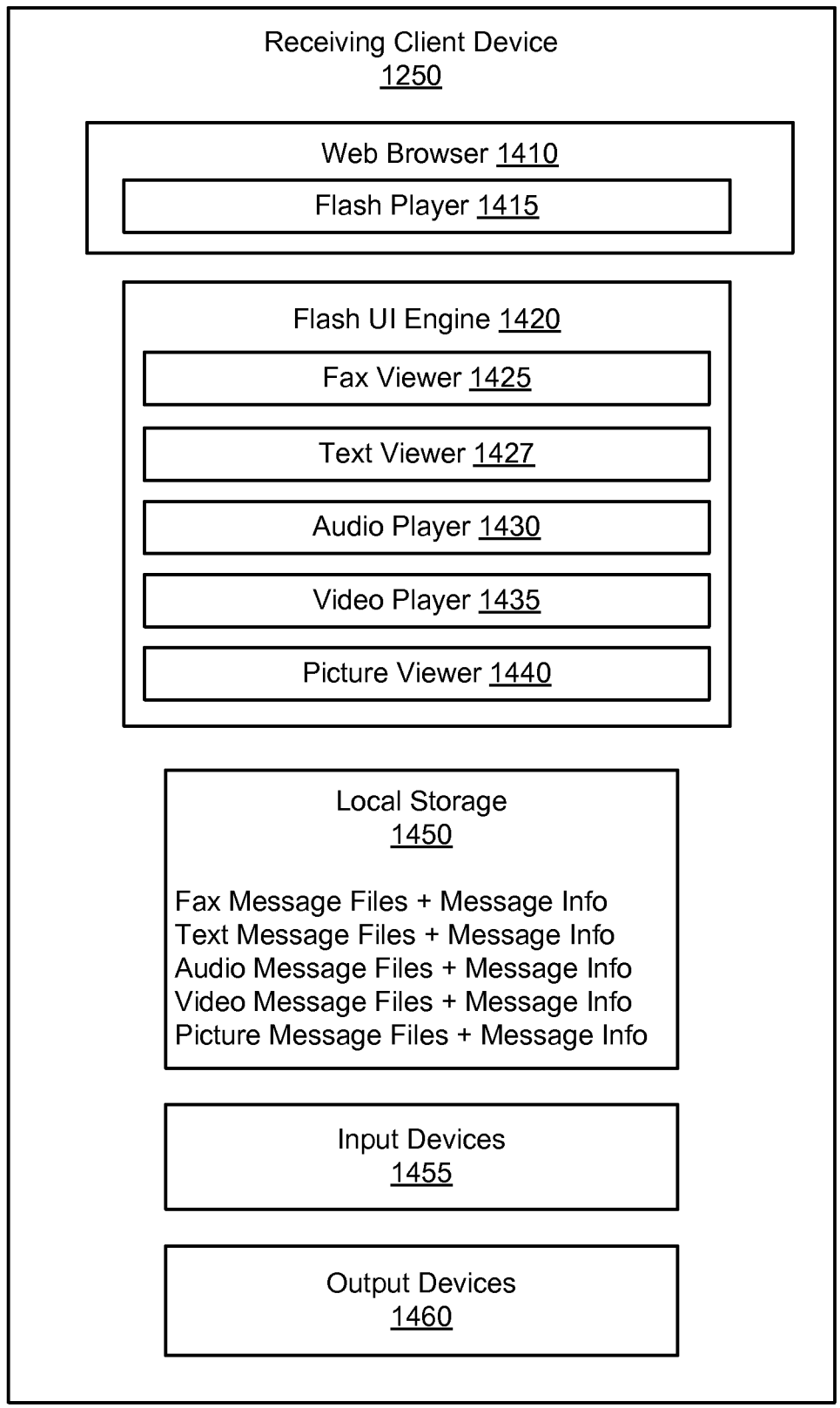
FIG. 14 is a conceptual diagram showing components of an exemplary receiving client device in which some embodiments operate.

FIG. 14 is a conceptual diagram showing components of an exemplary receiving client device 1250 in which some embodiments operate. As shown in FIG. 14, the receiving client device 1250 comprises a Flash UI engine 1420 and a web browser 1410 comprising a Flash player 1415. The web browser 1410 may comprise a web browser engine having computer hardware configured to perform embodiments herein. The Flash player 1415 may comprise a Flash player engine having computer hardware configured to perform embodiments herein. The Flash player 1415 may comprise Adobe® Flash® Player provided by Adobe Systems Incorporated. The terms "web browser" and "web browser engine" may be used interchangeably and the terms "Flash player" and "Flash player engine" may be used interchangeably.

The Flash UI engine 1420 comprises a message UI engine and a settings UI engine. The message UI engine may be used by a user to access his/her messages through the message service system 1220. The settings UI engine may be used by an administrator to access messages of other users of the message service system 1220 and to perform various administrative functions, such as changing configuration settings, etc.

As shown in FIG. 14, the Flash UI engine 1420 may comprise a plurality of different embedded application engines 1425-1440 within the Flash UI 1420 for presenting (e.g., displaying or playing back) a plurality of different message file types in a plurality of different format types. Each embedded application 1425-1440 may be configured for decoding and presenting one or more particular message file types in one or more different formats. In the example of FIG. 14, the embedded applications include (and thus the Flash UI Engine 1420 includes) a fax viewer 1425 for viewing fax messages, a text viewer 1427 for viewing text messages, an audio player 1430 for playing back voice/audio messages, a video player 1435 for playing back video messages, and a picture viewer 1440 for viewing picture messages.

In some embodiments, each embedded application 1425-1440 may be configured for decoding and presenting one or more particular message file types in a plurality of different formats. For example, the audio player 1430 may be configured for playing back voice/audio messages in a plurality of different formats (e.g., MP3, AIFF, WAV, etc.). In other embodiments, the Flash UI 1420 may include different embedded applications for different format types of the same message type. For example, the Flash UI 1420 may include a first embedded application for audio messages in a first format and a second embedded application for audio messages in a second format. As such, the Flash UI 1420 leverages the multimedia capabilities of Flash programs.

As shown in FIG. 14, the receiving client device 1250 also comprises a local storage device 1450 (such as a disk device, solid state device, etc.). In some embodiments, message files and associated message information may be downloaded and stored to the local storage 1450. In the example shown in FIG. 14, the local storage device 1450 may store fax message files, text message files, voice/audio message files, video message files, and picture message files and the message information associated with each message file. As known in the art, Flash programs also provide strong support and capabilities for local storing and caching of data. In some embodiments, the Flash UI 1420 leverages this local caching support by downloading and storing all current messages for an intended recipient (user) to the local storage device 1450 on the receiving client device 1250. A local storing method 1800 is discussed below in relation to FIG. 18.

As shown in FIG. 14, the receiving client device 1250 also comprises input device 1455 for providing user input and output devices 1460 for presenting the messages. The input devices 1455 may be of any type that allows an end user to provide input into a computer system. The input devices 1455, such as a keyboard, mouse, trackball, etc. allows a user to provide user input and selections and interact with the Flash UI 1420. The output devices 1460 may be of any type generally used by a computer system to provide information to an end user. The output devices 1445 may include, for example, a display (e.g., television, monitor, etc.) and audio devices (e.g., headphone jack, speakers, etc.).

Each receiving client device 1250 may further comprise various computer hardware components configured for implementing embodiments described herein. For example, a receiving client device 1250 may comprise a computing device 1100 or a mobile computing device 1150 shown in FIG. 11. The receiving client device 1250 may include the various computer hardware components (e.g., processor 1102, memory 1104, storage device 1106) of the computing devices 1100 or 1150 that are configured for implementing embodiments described herein. These computer hardware components are described in relation to FIG. 11 and are not discussed in detail here.

B. Connection with Message Server and Homepage User Interface

After the Flash media UI file 1312 is installed, the receiving client device 1250 connects with a message server 1320 of the message access system 1230. This may be performed, for example, by the receiving client device 1250 sending a connection request to the message access system 1230 (by using the web browser 1410 to submit a web address associated with the message access system 1230). The connection request may be received by a load balancer 1315 of the message access system 1230. The load balancer 1315 may be configured to receive and distribute connection requests from receiving client devices 1250 to the message servers 1320 for processing. For example, the load balancer 1315 may be configured to receive and route connection requests in rotating sequence to the message servers 1320 to evenly distribute connection requests among the plurality of message servers 1320. Using the load balancer 1315 and the plurality of message servers 1320 in this manner also provides message server redundancy to avoid a single point of failure in the message access system 1230. After a message server 1320 receives the connection request, the receiving client device 1250 may be directly connected with the message server 1320 through the connection system 1215.

The message server 1320 then processes the connection request by sending a login page to the receiving client device for requesting login information. Login information may comprise, for example, a user identifier (e.g., username and/or phone number) and password. The receiving client device 1250 sends the login information and the message server 1320 may verify the login information. The login information for a plurality of users may be stored to the account database 1325. After the message server 1320 verifies the login information on the account database 1325, the message server 1320 may send the receiving client device 1250 a homepage UI which is displayed on a display (e.g., monitor or screen) of the receiving client device 1250.

The homepage UI may be formatted using a markup language (e.g., HTML, XML) or a non-markup language. The homepage UI does not display any message information. The homepage UI may display a plurality of selectable icons, each icon for selecting and executing a particular UI having particular functions. The homepage UI comprises a "message" icon for selecting and executing the message UI and/or a "settings" icon for selecting and executing the settings UI.

C. Components for Accessing Messages with Flash User Interface

The homepage UI may receive a user selection (through an input device such as a mouse, trackball, keyboard, etc.) of the "message" icon on the homepage UI. If so, the receiving client device 1250 executes the message UI (Flash UI 1420). In some embodiments, the receiving client device 1250 displays the message UI as a separate pop-up window that overlays the homepage UI. In other embodiments, the receiving client device 1250 displays the message UI as a separate pop-up window from the window that displays the homepage UI. Closing the message UI closes the pop-up window so the homepage UI is visible again.

Upon the message icon being selected, the message UI automatically requests and displays a message list comprising a list of all current messages of the user. The message list may comprise message information for all current messages of the user (as identified by the user identifier in the login information). Current messages may comprise new messages not yet displayed to the user as well as messages previously displayed but not yet deleted by the user. The message UI may send a request for the message list to the message server 1320. In turn, the message server 1320 may retrieve the message list for the user from the account database 1325. The message server 1320 may comprise application programming interfaces (APIs) configured for interacting with the account database 1325 for retrieving message information from the account database 1325.

Figure 15:
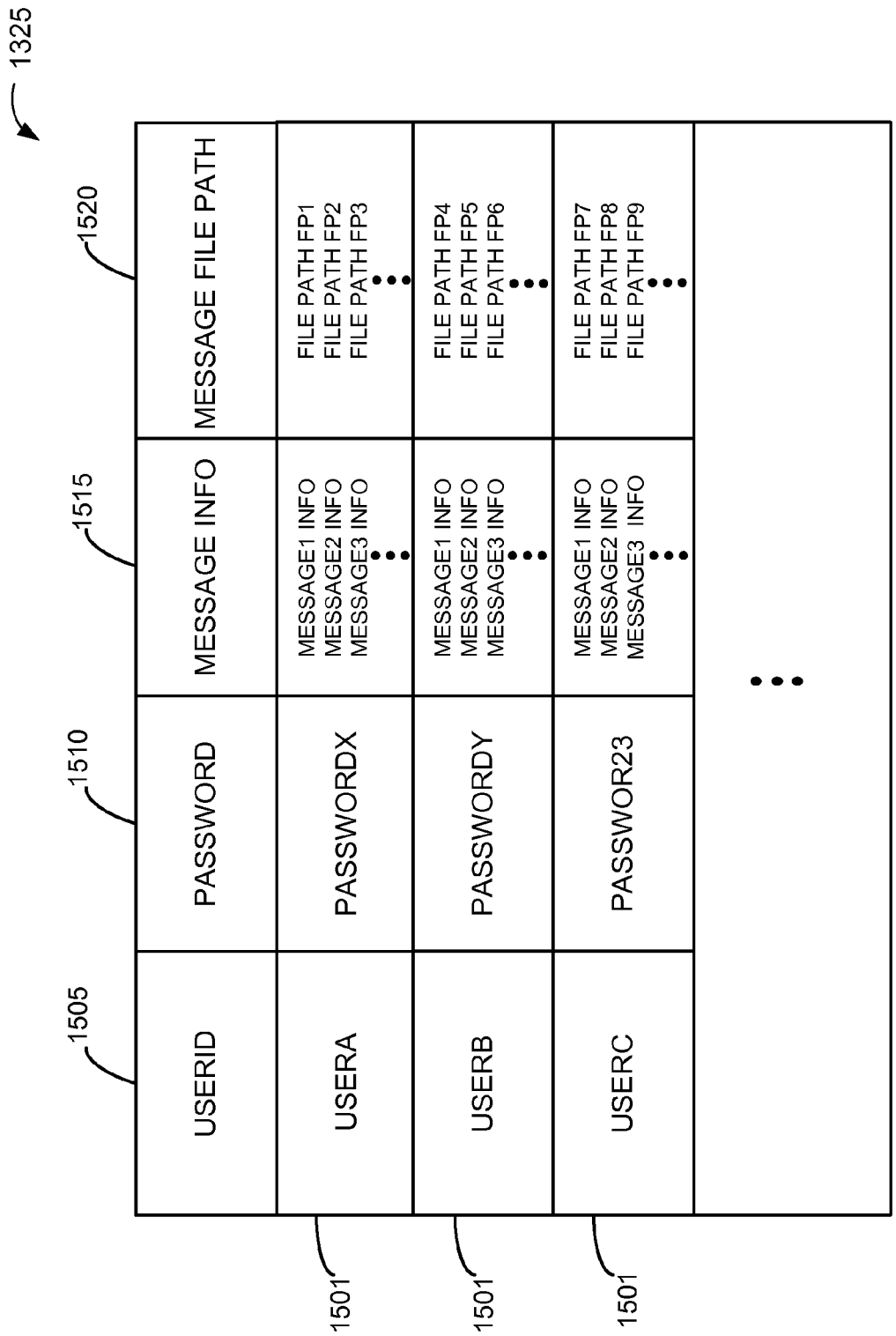
FIG. 15 shows a conceptual diagram of an exemplary account database.

The account database 1325 stores message information for all current messages for a plurality of users. FIG. 15 shows a conceptual diagram of an exemplary account database 1325. As shown in the example of FIG. 15, the account database 1325 may comprise a plurality of entries 1501, each entry 1501 having a plurality of data fields 1505-1520. The account database 1325 may comprise an entry 1501 for each current user/subscriber of the message service system 1220. The data fields may include a user identifier (e.g., username and/or phone number), password 1510, message information 1515, and message filepath 1520. The field for message information 1515 may comprise message information for each current message corresponding to the user identifier. The field for message filepath 1520 may comprise a filepath for each current message, the filepath being used to retrieve the current message that is stored on the message storage system 1225.

As described above, the message storage system 1225 stores message files and message information associated with each message file. The account database 1325 may periodically synchronize with the message storage system 1225 to update the data in the account database 1325. In this manner, the account database 1325 may contain up-to-date message information and filepaths for current messages for each user. Note that message information for each stored message comprises various information including a user identifier for the intended recipient (e.g., username and/or phone number). The user identifier in the message information may be used to determine which entry 1501 in the account database 1325 to store the message information by matching the user identifier in the message information with the user identifier in the entry 1501.

After the message server 1320 retrieves the message list (comprising message information for all current message for the user) from the account database 1325, the message server 1320 sends the message list to the receiving client device

1250 via the connection system 1215. The message UI on the receiving client device 1250 then displays the message list on an "inbox" page. The message UI may display the message information for all current messages by displaying for each current message, for example, an identifier for the sending client device (e.g., the phone number of a caller who left a voicemail), the message type, the date and time the message was received, etc. The message UI may also display a selectable "presentation" icon corresponding to each current message that may be selected for presenting (viewing or playing back) the current message.

The message UI may then receive, from the user, a selection of a presentation icon for a particular message. In response, the message UI sends the message server 1320 a request for the message file corresponding to the selected message. The message server 1320 may retrieve the filepath for the selected message from the account database 1325 and use the filepath to retrieve the selected message file from the message storage system 1225. The message server 1320 may comprise application programming interfaces (APIs) configured for interacting with the message storage system 1225 for retrieving message files from the message storage system 1225.

As known in the art, a filepath may represent a route to a file on a storage device that may be mapped to a physical address location on the storage device where the file is stored. In some embodiments, the message server 1320 maps the filepath to the physical address location of the message file. In other embodiments, the message storage system 1225 maps the filepath to the physical address location of the message file. Filepath mapping and alternative embodiments for the message storage system 1225 are discussed below in relation to FIG. 19.

After retrieving the requested message file, the message server 1320 sends the requested message file to the receiving client device 1250 which then presents the requested message file. To present the message file, the message UI may select and execute an embedded application appropriate for the message and format type of the message file. For example, if the message file is an audio message file in a first format, the message UI may select and execute an embedded application that is configured for playing audio files in the first format. In some embodiments, after receiving the requested message file, the receiving client device 1250 stores the requested message file to its local storage 1450 and then presents the message file from the local storage 1450.

To present the selected message file, the message UI may provide and display an embedded application UI for the embedded application. In some embodiments, the message UI may provide a different embedded application UI for each embedded application. Each embedded application UI may comprise different features and selectable icons depending on the embedded application. For example, the message UI may provide an audio UI for an audio player, the audio UI having a selectable playback button and a volume control. In some embodiments, an embedded application UI may be integrated in the same window as the message UI (where the message information for one or more messages is also displayed). Integrated embedded application UIs may be provided for commonly used embedded applications. A non-integrated embedded application UIs may be provided for not commonly used embedded applications.

In addition to presenting messages, the message UI may also provide other selectable icons for other message functions, such as message forwarding, message deleting, marking the message as read or unread, blocking the sender, calling the sender, sending a fax to the sender, etc. Upon receiving a user selection of a message function, the message UI executes the message function in response. These additional message functions may also be provided by embedded applications configured for performing the message functions. For example, an embedded application may comprise a softphone application for calling back a sender. These additional message functions are discussed below in Section IV.

The user may interact with the message UI by selecting the various message functions and then select to close the message UI. Upon receiving a selection to close the message UI, the separate pop-up window of the message UI closes and the underlying homepage UI is displayed. The homepage UI may receive a user selection of the "settings" icon on the homepage UI. If so, the receiving client device 1250 executes the settings UI. In some embodiments, the receiving client device 1250 displays the settings UI as a separate pop-up window that overlays the homepage UI.

The settings UI may be used by an administrator to access messages of other users through the message access system 1230 and to perform various administrative functions, such as changing configuration settings, etc. The settings UI may provide message lists and message files of other users utilizing the devices and methods described herein. The settings UI is described further below in Section IV. An administrator user may interact with the settings UI to perform various administrative functions and then select to close the settings UI. Upon receiving a selection to close the settings UI, the separate pop-up window of the settings UI closes and the underlying homepage UI is displayed.

In some embodiments, the message access system 1230 further comprises a message synchronization server 1330 for synchronizing messages and message information between the receiving client device 1250 and the message service system 1220. Message synchronization may be needed, for example, when a user of a receiving client device 1250 receives, deletes, or reads messages, and the message service system 1220 needs to be updated to reflect these message changes. The receiving client device 1250 may interact with the message synchronization server 1330 which may interact with a message server 1320 to synchronize messages and message information for the user of the receiving client device 1250. In some embodiments, a message synchronization method described in U.S. Pat. No. 7,702,669 (issued on Apr. 20, 2010, entitled "Synchronization in Unified Messaging Systems") is used. In other embodiments, other message synchronization methods known in the art may be used.

D. Non-Markup Language and Non-HTTP Embodiments

The Flash media UI file 1312 comprises a compilable file (a file able to be compiled) having only compilable program instructions (instructions able to be compiled), preferably Flash® program instructions. The Flash media UI file 1312 is compiled into machine language that is executable by a computer processor. The Flash UI engine may include a computer processor that executes the Flash media UI file 1312 to perform embodiments herein, wherein the Flash UI engine is compatible with a Flash® Player (from Adobe Systems Incorporated). The Flash media UI file 1312 may comprise programming instructions for a message UI, a settings UI, and a plurality of embedded applications for performing various functions described herein. Preferably, the Flash media UI file is in the Small Web Format (SWF) format as a .swf file. The receiving client device provides a web browser having the Adobe® Flash® Player and the Flash media UI file as a Flash plug-in program. The Flash media UI file 1312 does not comprise any markup language; that is, the Flash media UI file comprises a file format other than markup language format. Preferably, the Flash media UI file comprises only Flash® programming instructions.

The message information is preferably formatted in a non-markup language when stored in the message storage system 1225, the account database 1325, and the receiving client device 1250. The message information is preferably also transmitted in a non-markup language between the various components in accordance with embodiments herein. For example, the message information may be transmitted in a non-markup language between the message storage system 1225, account database 1325, message server 1320, and the receiving client device 1250. In some embodiments, the message information is stored and transmitted in comma-delimited format or in another type of non-markup language format.

As known in the art, a markup language is a text-encoding system that uses a set of markup tags to annotate text within a text document. Examples of markup languages include hyper-text mark-up language (HTML) and extensible markup language (XML). As known in the art, comma-delimited format is an example of a non-markup language format and may also be referred to as comma separated values (CSV). Comma-delimited format may comprise a data format whereby each piece of information is separated by a comma. For example, message information for a message file may be formatted as: a size of the message, sender phone number, sender name, message type, date and time message received. As known in the art, comma-delimited format is widely used and supported as most database systems and other data-intensive applications, such as spreadsheet applications, are able to import and export comma-delimited information.

Preferably, message data is transmitted between the various components using a non-HyperText Transfer Protocol (non-HTTP). For example, the message data may be transmitted in a non-HTTP protocol between the message storage system 1225, account database 1325, message server 1320, and the receiving client device 1250. In these embodiments, the message data may be transmitted using a custom protocol (i.e., a protocol proprietary to this system) or standard protocol (e.g., File Transfer Protocol (FTP) or WebSocket) that is a non-HTTP protocol. In further embodiments, the Flash media UI file 1312 stored on the program server 1310 is transmitted to the receiving client device 1250 using a non-HTTP protocol, such as a custom protocol or standard protocol (e.g., FTP or WebSocket) that is a non-HTTP protocol.

As known in the art, FTP comprises a network protocol for transferring files from one computer device to another computer device over a TCP/IP-based network, such as the Internet. FTP may be used to transfer any variety of file types. As known in the art, WebSocket comprises a network protocol for providing bi-directional, full-duplex communications channels, over a single Transmission Control Protocol (TCP) socket. WebSocket may be implemented in any client or server application, including web browsers and web servers.

E. Method for Accessing Messages on Message Service System

Figure 16:
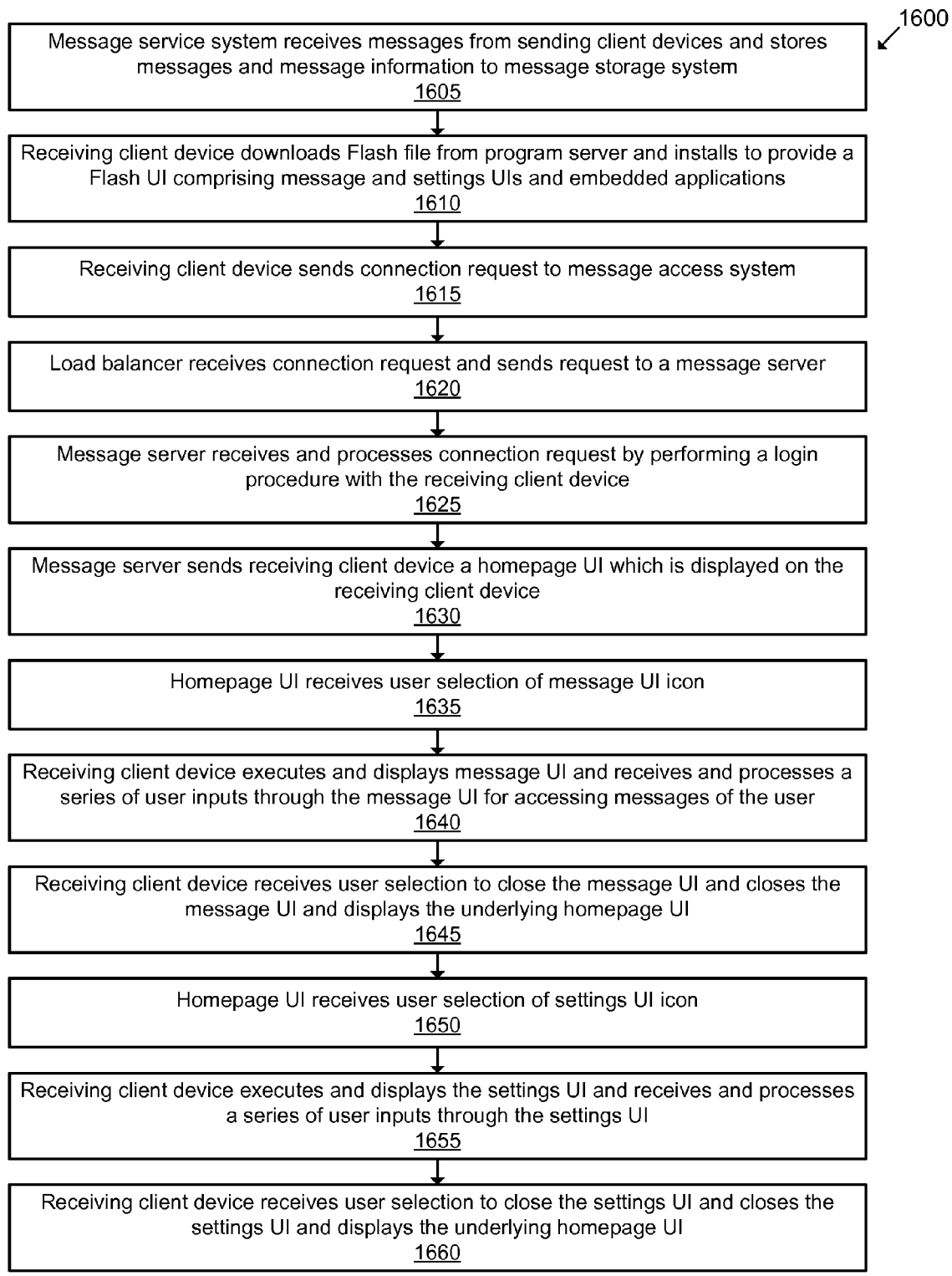
FIG. 16 shows a flowchart of an overall method for accessing messages on a message service system.

FIG. 16 shows a flowchart of an overall method 1600 for accessing messages on a message service system 1220. The method 1600 is described in relation to FIGS. 12, 13, 14, and 15 which conceptually illustrate the steps of the method 1600. The order and number of steps of the method 1600 are for illustrative purposes only to demonstrate various operations that may be performed. In other embodiments, however, a different order and/or number of steps may be used.

The method 1600 begins by the message service system 1220 receiving (at 1605) messages from sending client devices 1205 through the connection system 1215 and storing the messages and message information for each message to the message storage system 1225. The stored messages may comprise message files of a plurality of different message types in a plurality of different format types. The message information for a message may also be stored with the message.

The receiving client device 1250 downloads (at 1610) the Flash media UI file 1312 from the program server 1310 and installs the Flash media UI file 1312 to provide a Flash UI engine on the receiving client device 1250. The Flash UI engine 1420 may comprise a message UI engine and a settings UI engine and comprise a plurality of embedded application engines for presenting a plurality of different message and format types.

The receiving client device 1250 then sends (at 1615) a connection request to the message access system 1230. The load balancer 1315 of the message access system 1230 receives (at 1620) the connection request and sends the request to one of the message servers 1320. The message server 1320 receives and processes (at 1625) the connection request by performing a login procedure with the receiving client device by receiving login information from the receiving client device. The message server 1320 may verify the login information using the account database 1325 that stores login information for current users/subscribers of the message service system 1220.

After the login procedure, the message server 1320 may send (at 1630) the receiving client device 1250 a homepage UI which is displayed on the receiving client device 1250. The homepage UI may display a "message" icon for selecting and executing the message UI and a "settings" icon for selecting and executing the settings UI.

On the receiving client device 1250, the homepage UI may receive (at 1635) a user selection of the "message" icon. In response, the receiving client device 1250 may execute and display (at 1640) the message UI and receive and process a series of user inputs through the message UI for accessing messages of the user. A method 1700 for providing a message UI for accessing messages is described below in relation to FIG. 17. An alternative method 1800 for providing a message UI for accessing messages by using local caching is described below in relation to FIG. 18. The receiving client device 1250 may receive (at 1645) a user selection to close the message UI and then closes the message UI and displays the underlying homepage UI.

On the receiving client device 1250, the homepage UI may receive (at 1650) a user selection of the "settings" icon. In response, the receiving client device 1250 may execute and display (at 1655) the settings UI and receive and process a series of user inputs through the settings UI for allowing an administrator user to access messages of other users and perform various administrative functions. The settings UI is described further below in Section IV. The receiving client device 1250 may receive (at 1660) a user selection to close the settings UI and then closes the settings UI and displays the underlying homepage UI.

F. Method for Accessing Messages with Message UI

Figure 17:
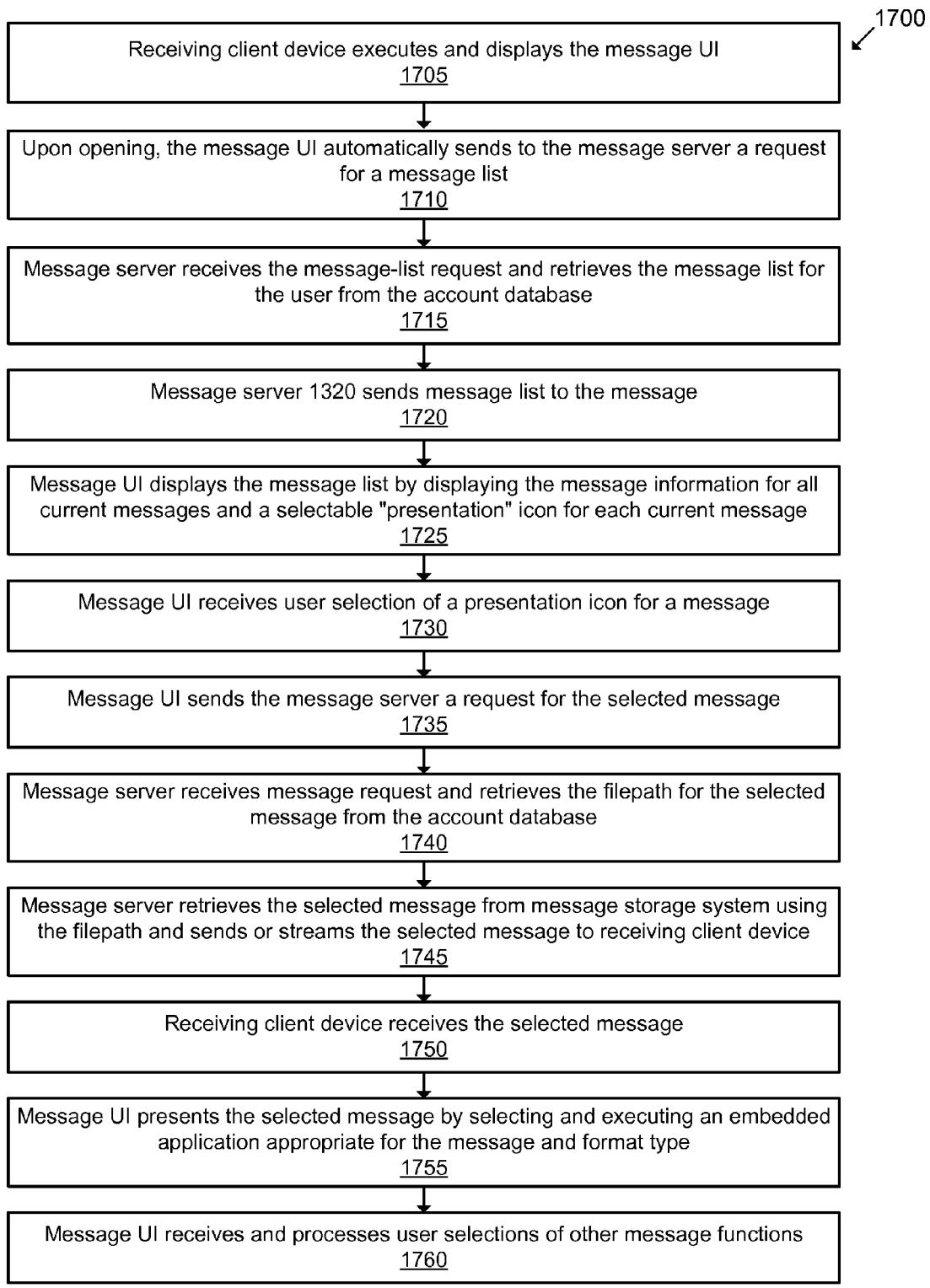
FIG. 17 shows a flowchart of a method for providing a message UI for accessing messages.

FIG. 17 shows a flowchart of a method 1700 for providing a message UI for accessing messages. The method 1700 is described in relation to FIGS. 12, 13, 14, and 15 which conceptually illustrate the steps of the method 1700. The order and number of steps of the method 1700 are for illustrative purposes only to demonstrate various operations that may be performed. In other embodiments, however, a different order and/or number of steps may be used. The method 1700 may comprise step 1640 of the method 1600 of FIG. 16.

The method 1700 begins by the receiving client device 1250 executing and displaying (at 1705) the message UI. Upon opening, the message UI automatically sends (at 1710) to the message server 1320 a request for a message list. The message list may comprise message information for all current messages of the user (as identified by the user identifier in the login information).

The message server 1320 receives (at 1715) the message-list request and retrieves the message list for the user (as identified by the user identifier) from the account database 1325. The message server 1320 then sends (at 1720) the message list to the message UI on the receiving client device 1250. The message UI then displays (at 1725) the message list on an "inbox" page. The message UI may display the message information for all current messages as well as a selectable "presentation" icon for each current message for presenting (viewing or playing back) the current message.

The message UI then receives (at 1730) a user selection of a presentation icon for a particular message. In response, the message UI sends (at 1735) the message server 1320 a request for the message file of the selected message. The message server 1320 may receive (at 1740) the message request and retrieves the filepath for the selected message from the account database 1325. The message server 1320 then retrieves (at 1745) the selected message from the message storage system 1225 using the filepath and sends (e.g., streams) the selected message to the receiving client device 1250.

The receiving client device 1250 receives (at 1750) the selected message and presents (at 1755) the selected message by selecting and executing an embedded application appropriate for the message and format type of the message file. To present the selected message file, the message UI may provide and display an embedded application UI for the embedded application. In some embodiments, an embedded application UI may be integrated in the same window as the message UI or be displayed in a separate window (e.g., pop-up window) as the message UI.

In some embodiments, e.g., for media messages, the message server 1320 may stream (at 1745) the selected message to the receiving client device 1250. As known in the art, Flash programs provide strong support and capabilities for media streaming. Streaming media may comprise a media message (e.g., audio or video message) that is constantly received and presented by the receiving client device 1250 (in steps 1750 and 1755) while constantly being delivered by the message server 1320 (in step 1745) until the message stream completes. As used herein, streaming a message indicates receiving of message data that is presented upon being received by the receiving client device 1250, while the transmission of the message data by the message server 1320 is still continuing. In these embodiments, the message may not be stored to the local storage of the receiving client device 1250.

The user may continually select messages for presentation and steps 1730 to 1755 of the method 1700 may be repeated for every message the user selects for presentation. The message UI may also receive (at 1760) and process user selections of other message functions, such as message forwarding, message delete, blocking sender, calling sender, etc.

G. Method for Accessing Messages with Message UI using Local Caching

Figure 18:
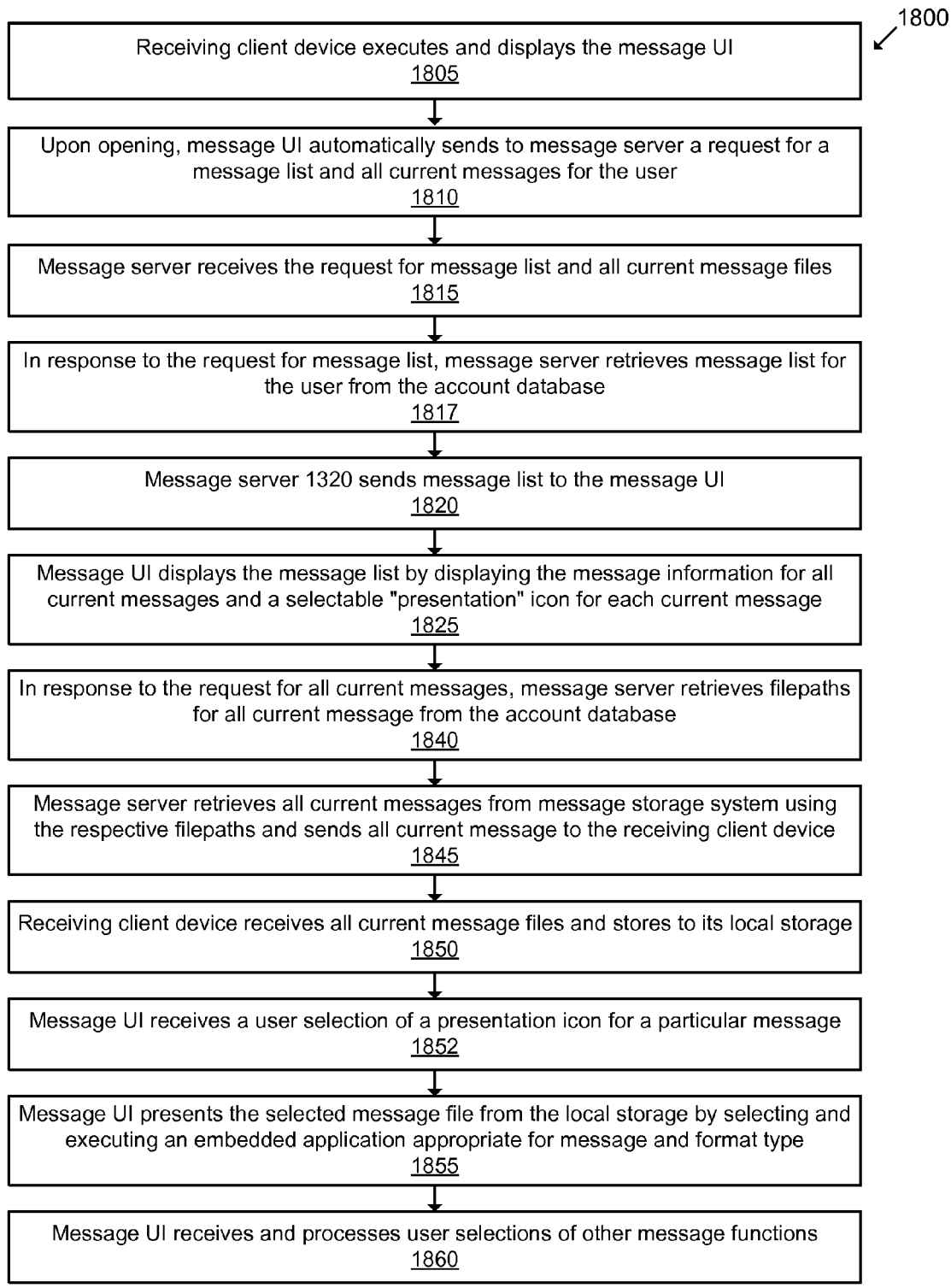
FIG. 18 shows a flowchart of an alternative method for providing a message UI for accessing messages by using local caching.

FIG. 18 shows a flowchart of an alternative method 1800 for providing a message UI for accessing messages by using local caching. The method 1800 is described in relation to FIGS. 12, 13, 14, and 15 which conceptually illustrate the steps of the method 1800. The order and number of steps of the method 1800 are for illustrative purposes only to demonstrate various operations that may be performed. In other embodiments, however, a different order and/or number of steps may be used. The method 1800 may comprise step 1640 of the method 1600 of FIG. 16.

The method 1800 begins by the receiving client device 1250 executing and displaying (at 1805) the message UI. Upon opening, the message UI automatically sends (at 1810) to the message server 1320 a request for a message list and message files for all current messages of the user. In some embodiments, the message UI automatically sends the request for all current messages of the user without human initiation, interaction, or intervention. In these embodiments, the message UI sends the request for all current messages of the user without receiving a selection of a current message from the user.

The message server 1320 receives (at 1815) the request for the message list and all current message files. In response to the request for the message list, the message server 1320 retrieves (at 1817) the message list for the user from the account database 1325. The message server 1320 then sends (at 1820) the message list to the message UI on the receiving client device 1250. The message UI then displays (at 1825) the message list on an "inbox" page. The message UI may display the message information for all current messages as well as a selectable "presentation" icon for each current message for presenting the current message.

In response to the request for all current messages, the message server 1320 retrieves (at 1840) the filepaths for all current message from the account database 1325. The message server 1320 then retrieves (at 1845) all current messages from the message storage system 1225 using the respective filepaths and sends all current message to the receiving client device 1250. Note that steps 1840 and 1845 may be performed concurrently with steps 1817 and 1820 and a different order of steps may be used. The receiving client device 1250 receives (at 1850) all the current message files and stores all the current message files to its local storage 1450.

The message UI then receives (at 1852) a user selection of a presentation icon for a particular message. The message UI presents (at 1855) the selected message file by selecting and executing an embedded application appropriate for the message and format type of the message file. The selected embedded application may present the selected message file that is already stored to the local storage 1450.

The user may continually select messages for presentation and steps 1852 to 1855 of the method 1800 may be repeated for every message the user selects for presentation. The message UI may also receive (at 1860) and process user selections of other message functions.

As shown in FIG. 14, the local storage 1450 may store all the current message files for the user, the current message files comprising a plurality of messages of one or more different message types in one or more different format types. The local storage 1450 may store at least one current message file without receiving a user selection for presenting the current message. A message file may be stored to the local storage 1450 prior to receiving a user selection for presenting the message file. In some embodiments, upon receiving a user selection for presenting a message file, the message UI does not send to the message server 1320 a request for the message file and does not receive the message file from the message server 1320. In these embodiments, the response of the message UI to the user selection is performed without sending, to the message server 1320, a request for the message file and without receiving the message file from the message server 1320.

Since all current messages are already stored in the local storage 1450, any current message selected for presentation may be retrieved directly from the local storage 1450 without requiring separate retrieval from the message service system 1220. As such, the message UI may receive and store all current message files at one time while the receiving client device is connected to the message server 1320, and then present selected messages from local storage with the receiving client device no longer connected to the message server 1320. This may be advantageous if the receiving client device will not have continual access to the Internet to access the message server 1320, for example, if the user is boarding a plane or is in a location without Internet access. As such, the message UI may operate independent of whether the client device is able to access the Internet.

H. Alternative Message Storage System

Figure 19:
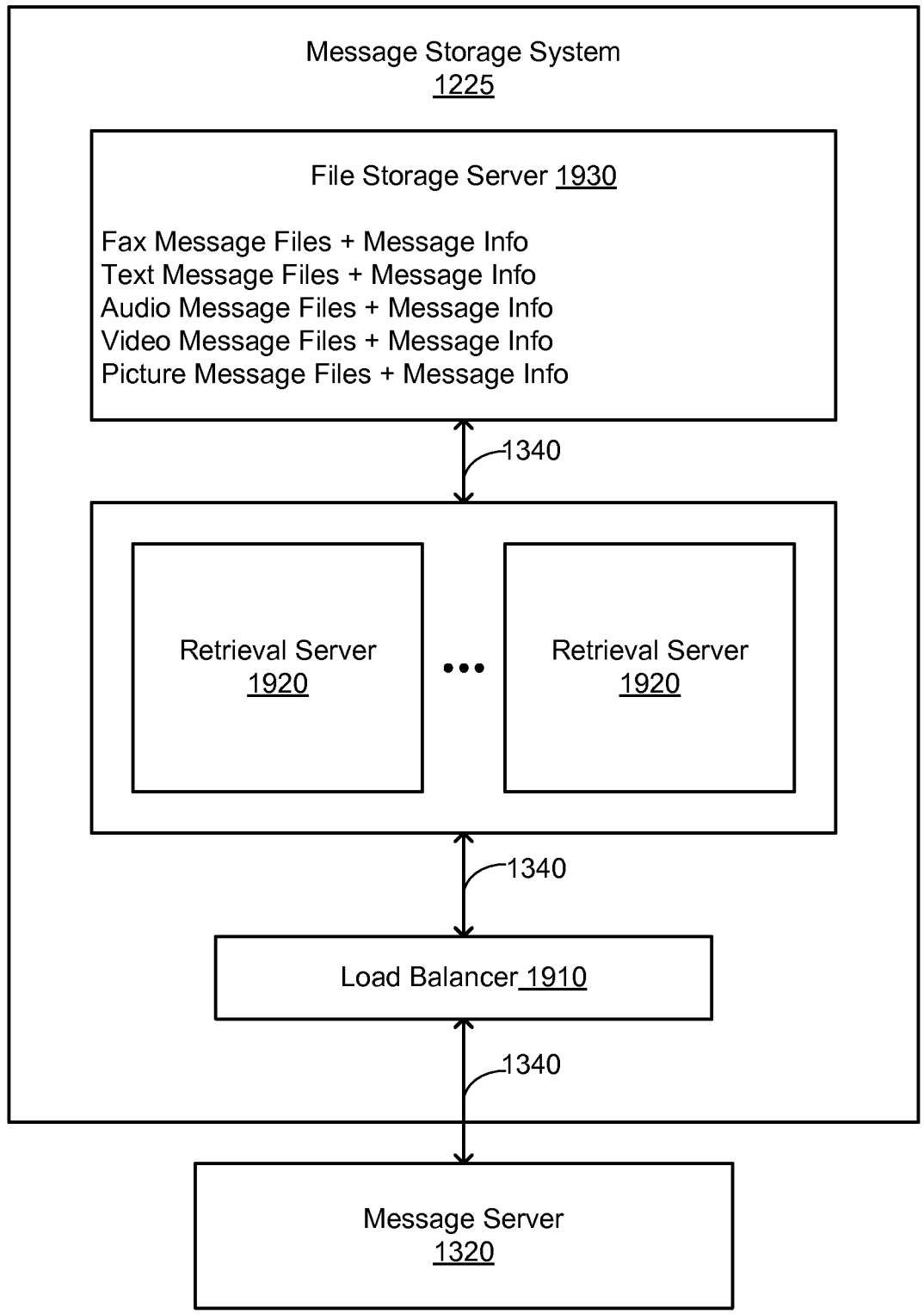
FIG. 19 is a conceptual diagram showing an exemplary message storage system in which some embodiments operate.

As discussed above, the message storage system 1225 received messages and message information for each message. FIG. 19 is a conceptual diagram showing an exemplary message storage system 1225 in which some embodiments operate. In some embodiments, the message storage system 1225 comprises at least one load balancer device 1910, at least one retrieval server 1920, and at least one file storage server 1930 that are interconnected by a computer network 1340.

The file storage server 1930 may store message files of a plurality of different messages and message information for each message file. The file storage server 1930 may comprise a storage system adapted to store and retrieve information/data on a plurality of storage devices (such as disk devices, solid state devices, etc.). The file storage server 1930 may comprise a storage operating system that implements a file system to organize logically the information as a hierarchical structure of directories and files on the storage devices.

The load balancer 1910 may receive requests for the retrieval of message files from the message servers 1320. The load balancer 1910 may be configured to receive and distribute message requests to the retrieval servers 1920 for processing. For example, the load balancer 1910 may be configured to receive and route message requests in rotating sequence to the retrieval servers 1920 to evenly distribute message requests among the plurality of retrieval servers 1920. Using the load balancer 1910 and the plurality of retrieval servers 1920 in this manner also provides retrieval server redundancy to avoid a single point of failure in the message storage system 1225.

The message request from a message server 1320 comprises the filepath of the requested message file. The retrieval server 1920 receives the message request and retrieves the requested message file from the file storage server 1930 using the filepath. The retrieval server 1920 may do so by mapping the filepath to a physical address location on a storage device of the file storage server 1930 where the message file is stored. After retrieving the requested message file, the retrieval server 1920 may send the message file to the message server 1320.

In other embodiments, however, the message storage system 1225 comprises only the file storage server 1930. In these embodiments, the message server 1320 retrieves requested message files directly from the file storage server 1930. In these embodiments, the message server 1320 may map the filepath to the physical address location on a storage device of the file storage server 1930 where the message file is stored.

I. Mobile Receiving Client Devices

In the embodiments described herein, a receiving client device 1250 may comprise any variety of devices capable of accessing messages. For example, a receiving client device 1250 may comprise a computing device 1100 (e.g., notebook computer, desktop computer, server, computing tablet, computing personal accessory, etc.) or a mobile computing device 1150 (e.g., cellular phone 112E, multimode phone 112F, smartphone, etc.) shown in FIG. 11. The receiving client device 1250 may include the various computer hardware components illustrated in FIG. 11 (e.g., processor 1102, memory 1104, storage device 1106) of the computing devices 1100 or 1150 that are configured for implementing embodiments described herein. A receiving client device 1250 comprising a computing device 1100 or a mobile computing device 1150 may execute the web browser application 1410 and the Flash UI 1420 for accessing messages on the message service system 1220 through the connection system 1215 as described herein.

In addition, a mobile computing device 1150 may access messages on the message service system 1220 using an appropriate native application (e.g., an iOS application running on an iPad® or iPhone® from Apple® Inc., an Android® application running on an Android-based smartphone, an application running on a Blackberry®, etc.). In some situations, a native application may be needed if the receiving client device 1250 does not support Flash programming instructions, such as IPhone OS (iOS) devices using Apple's iPhone operating system. As known in the art, such native applications as well as softphone applications do not use any markup language to define their user interfaces and may be compiled into binaries in a native format for the applicable device, whereby the binaries define the user interface.

Also, for a receiving client device 1250 comprising a mobile computing device 1150, the message service system 1220 will "push" (send) notifications of new messages to the receiving client device 1250 automatically when any new message is received. As such, notifications of new messages are typically sent immediately to the receiving client device 1250 as soon as a new message is received, without requiring the user to login or request notifications from the message service system 1220.

Figure 20:
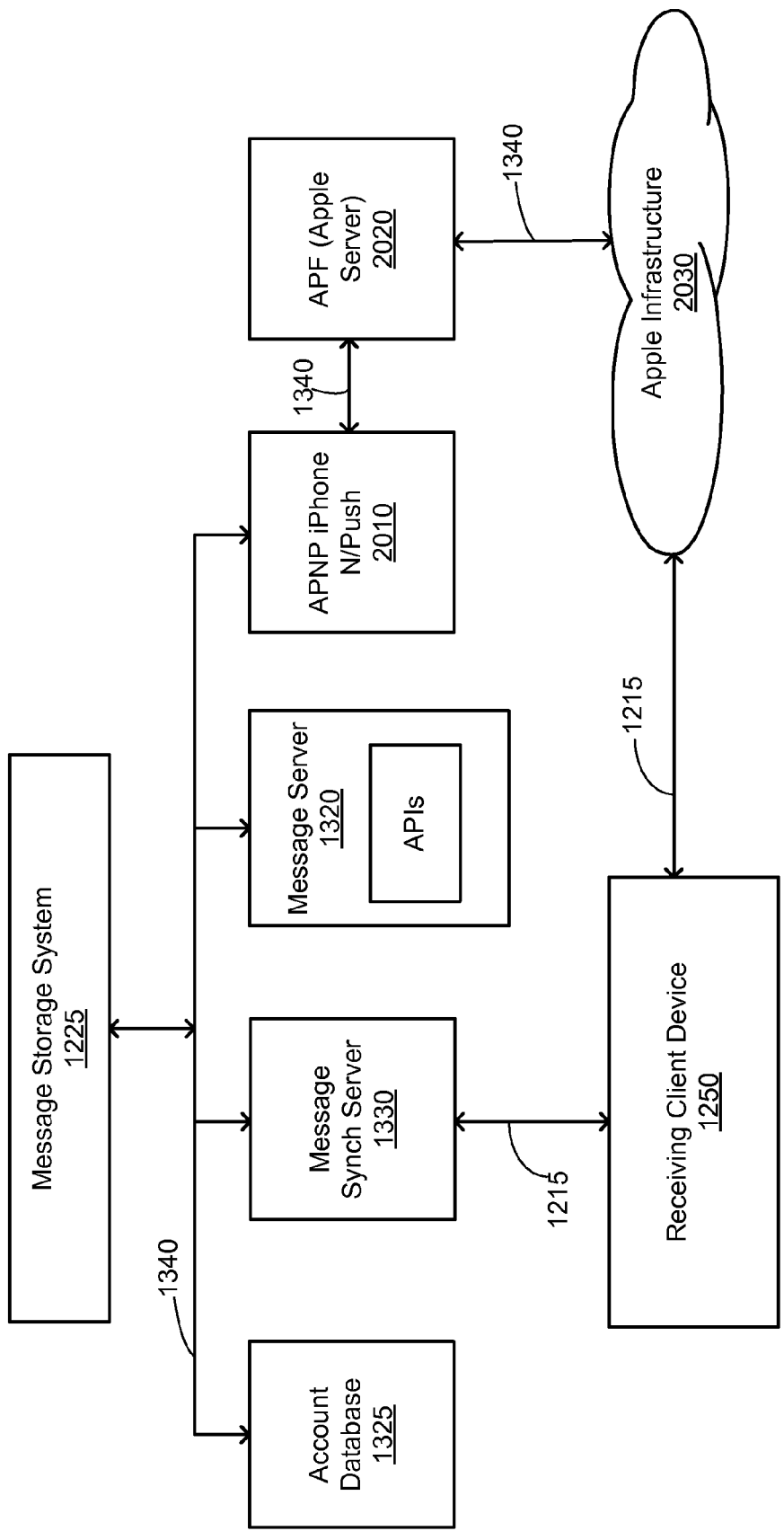
FIG. 20 shows a conceptual diagram of a mobile device environment in which some embodiments operate.

FIG. 20 shows a conceptual diagram of a mobile device environment 2000 in which some embodiments operate. For illustrative purposes, the mobile device environment 2000 comprises components for an iOS devices using Apple's iPhone operating system. In other embodiments, however, other mobile devices may be used. As shown in FIG. 20, the mobile device environment 2000 may comprise a message storage system 1225, at least one account database 1325, and at least one message synchronization server 1330, at least one message server 1320, an APNP iPhone N/Push server 2010, an Apple server (APF) 2020, and an Apple infrastructure 2030 interconnected through a computer network 1340.

The mobile device environment 2000 also includes a receiving client device 1250 connected with the message synchronization server 1330 and the Apple infrastructure 2030 through the connection system 1215. In some embodiments, the receiving client device 1250 comprises a mobile computing device 1150. In other embodiments, however, the receiving client device 1250 may comprise a computer device 1100 executing a softphone application. As known in the art, a softphone application may be used for making telephone calls over the Internet using a general purpose computer, rather than using dedicated hardware.

In some embodiments, the receiving client device 1250 receives messages and message information through the message synchronization server 1330, which retrieves messages and message information from the message server 1320. In these embodiments, the receiving client device 1250 connects and interacts directly with the message synchronization server 1330. The APnP iPhone N/Push server 2010 may send new message notifications for the receiving client device 1250 to the Apple infrastructure 2030, which sends the new message notifications to the receiving client device 1250.

In some embodiments, the receiving client device 1250 receives message information and message notifications from the message synchronization server 1330 in a non-markup language, such as comma-delimited format. In some embodiments, messages, message information, and message notifications are transmitted from the message synchronization server 1330 to the receiving client device 1250 using a non-HyperText Transfer Protocol (non-HTTP) such as a custom protocol.

J. Generic Computing Devices

As described above, FIG. 11 is a block diagram of computing devices 1100, 1150 that may be used to implement the systems and methods described herein. For example, the computing device 1100 or 1150 may comprise the sending client device 1205, receiving client device 1250, program server 1310, load balancer 1315, message server 1320, account database 1325, message synchronization server 1330, devices of the message storage system 1225 (such as the load balancer 1910, retrieval server 1920, file storage server 1930), an APNP iPhone N/Push server 2010, Apple server (APF) 2020, or Apple infrastructure 2030.

IV. Screen Shots and Functions of the Flash UI

A. Screen Shot and Functions of the Homepage UI

Figure 21:
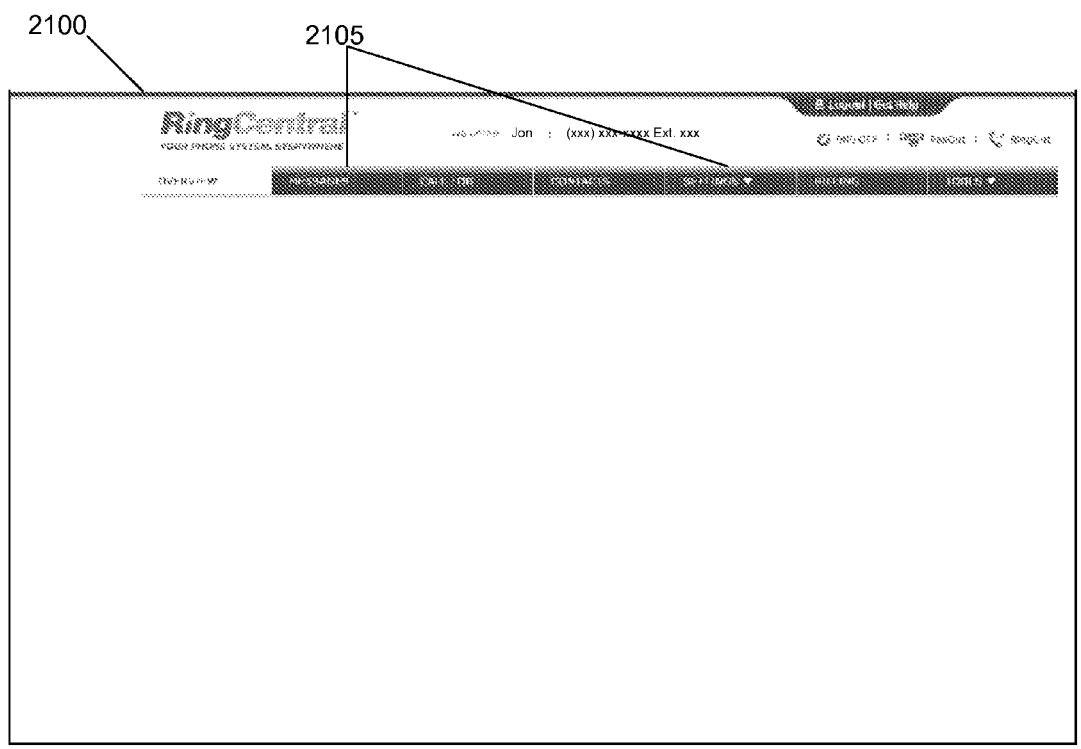
FIG. 21 shows an exemplary screen page of a homepage UI in accordance with some embodiments.

As described above, the message server 1320 may send the receiving client device 1250 a homepage UI which is displayed on the receiving client device 1250. FIG. 21 shows an exemplary screen page of a homepage UI 2100 in accordance with some embodiments. The homepage UI may be formatted using a markup language (e.g., HTML, XML) or a non-markup language. The homepage UI does not display any message information. The homepage UI may display a plurality of selectable icons 2105, each icon for selecting and executing a particular UI having particular functions. In some embodiments, the homepage UI comprises a "message" icon 1205 for selecting and executing the message UI and a "settings" icon 2105 for selecting and executing the settings UI.

B. Screen Shots and Functions of the Message UI

Figure 22A:
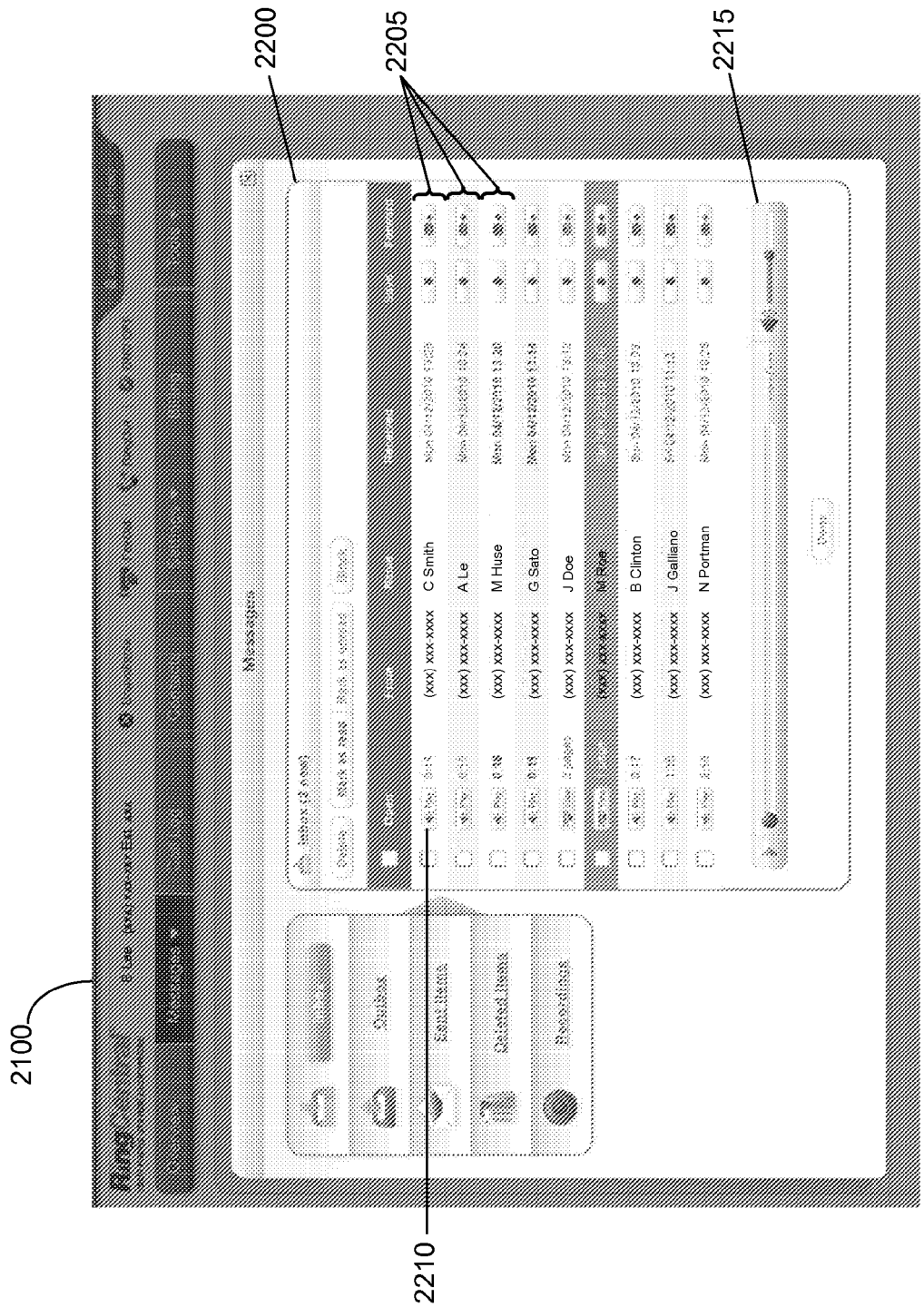
FIGS. 22A-E show exemplary screen pages of a message UI in accordance with some embodiments.

If the homepage UI receives a user selection of the "message" icon on the homepage UI, the receiving client device 1250 executes the message UI. FIGS. 22A-E show exemplary screen pages of a message UI 2200 in accordance with some embodiments. As shown in FIG. 22A, in some embodiments, the receiving client device 1250 may display the message UI 2200 as a separate pop-up window that overlays the homepage UI 2100.

As shown in FIG. 22A, the message UI 2200 may display message information 2205 for all current messages in list form on an "inbox" page. For each current message, the message information 2205 may include, for example, a size of the message (e.g., time length of the message, number of pages of the message), identifier for the sending client device (e.g., sender name and/or phone number), the message type, etc. The message UI 2200 may also display a selectable "presentation" icon 2210 corresponding to each current message that may be selected for presenting (e.g., viewing or playing back) the current message.

The message UI 2200 may provide one or more embedded application UIs 2215 for one or more embedded applications. In some embodiments, the message UI may provide a different embedded application UI for each embedded application. Each embedded application UI may comprise different features and selectable icons depending on the embedded application. In the example of FIG. 22A, the message UI 2200 provides an audio UI 2215 for an audio player, the audio UI having, for example, a selectable playback and pause button, forward and rewind controls, mute, and volume controls. In other embodiments, however, the message UI 2200 may provide fax/text UI for a fax/text viewer, a video UI for a video player, or a picture UI for a picture viewer.

In some embodiments, an embedded application UI 2215 may be integrated in the same window as the message UI 2200 (as shown in the example of FIG. 22A). In these embodiments, an embedded application UI 2215 is displayed in a same window that also displays the message information 2205 of one or more current messages. Within the window of the message UI, the integrated embedded application UI may have a first appearance (e.g., darker color) when it is inactive (not presenting a message file) and have a second appearance (e.g., lighter color) when it is active and presenting a message file, wherein the first and second appearances are different. Integrated embedded application UIs may be provided for commonly used embedded applications. For example, since voice messages are commonly received, an audio UI 2215 for an audio player may be always displayed in the same window as the message UI. In other embodiments, the integrated embedded application UI 2215 is another type of UI other than an audio UI. By configuring an embedded application UI 2215 in this manner, the message UI 2200 may present messages in a seamless and integrated manner.

In other embodiments, an embedded application UI may be displayed in a separate window (e.g., pop-up window) as the message UI when selected. A non-integrated embedded application UIs may be provided for non-commonly used embedded applications. For example, since video messages are less commonly received, a video UI for a video player may be displayed in a pop-up window when a video message is selected for presentation. In other embodiments, however, the video UI for the video player may be integrated similar to the audio UI as described above, and displayed in the same window as the message UI.

In addition to presenting messages, the message UI 2200 may also provide other selectable icons for additional message functions. As shown in the example of FIG. 22A, the additional message functions may include message forwarding, message delete, marking a message as read or unread, blocking sender, downloading and saving message to local storage, calling sender, sending a fax, adding a new contact, etc. Upon receiving a user selection of a message function, the message UI executes the message function in response. These additional message functions may also be provided by embedded applications configured for performing the additional message functions.

Figure 22B:
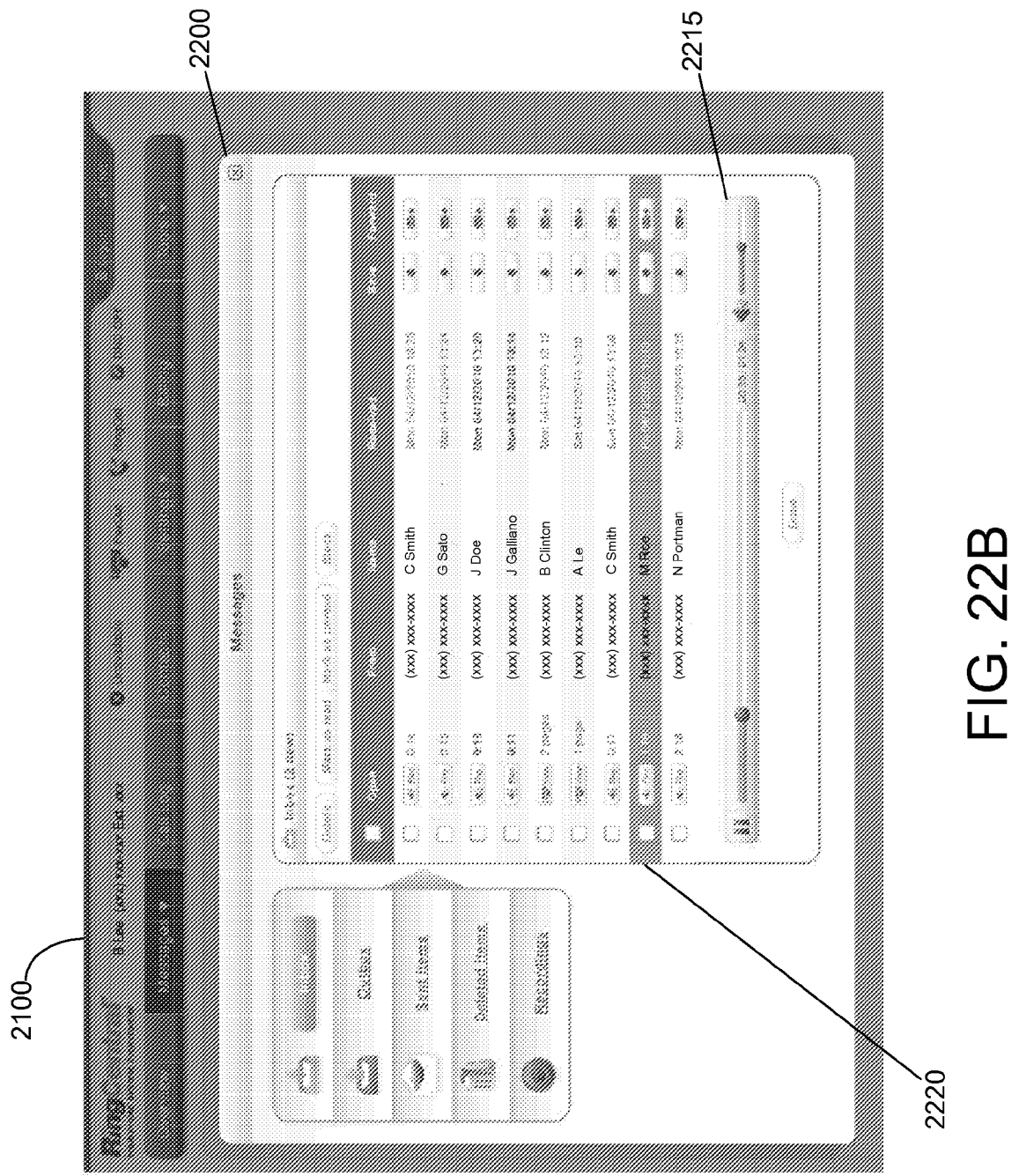

FIG. 22B shows an example of a current message being selected for presentation. As shown in FIG. 22B, a current message comprising a voice/audio message 2220 has being selected for presentation. As such, the message UI 2200 executes an embedded audio application (having audio UI 2215) to playback the voice/audio message 2220.

Figure 22C:
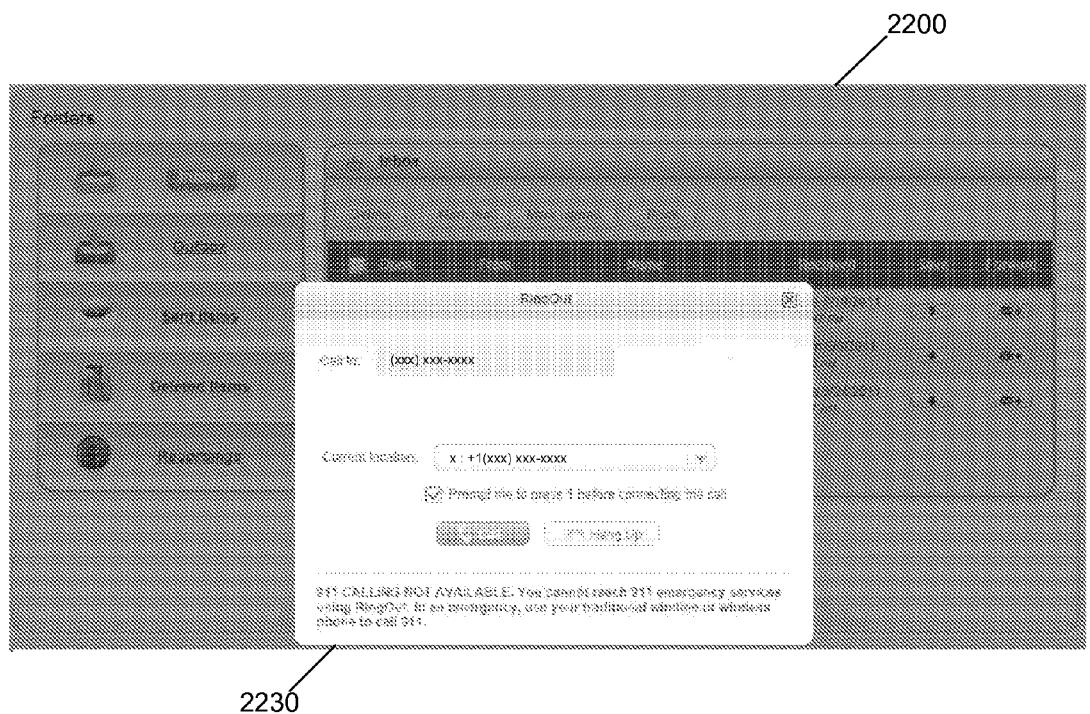

FIG. 22C shows an example of a softphone UI 2230 for calling back a selected sender number. The softphone UI 2230 may be invoked, for example, upon receiving a user selection of a sender phone number. As shown in FIG. 22C, upon being invoked, the message UI 2200 executes and displays the softphone UI 2230 in a separate pop-up window. The softphone UI 2230 may comprise fields for receiving user inputs.

Figure 22D:
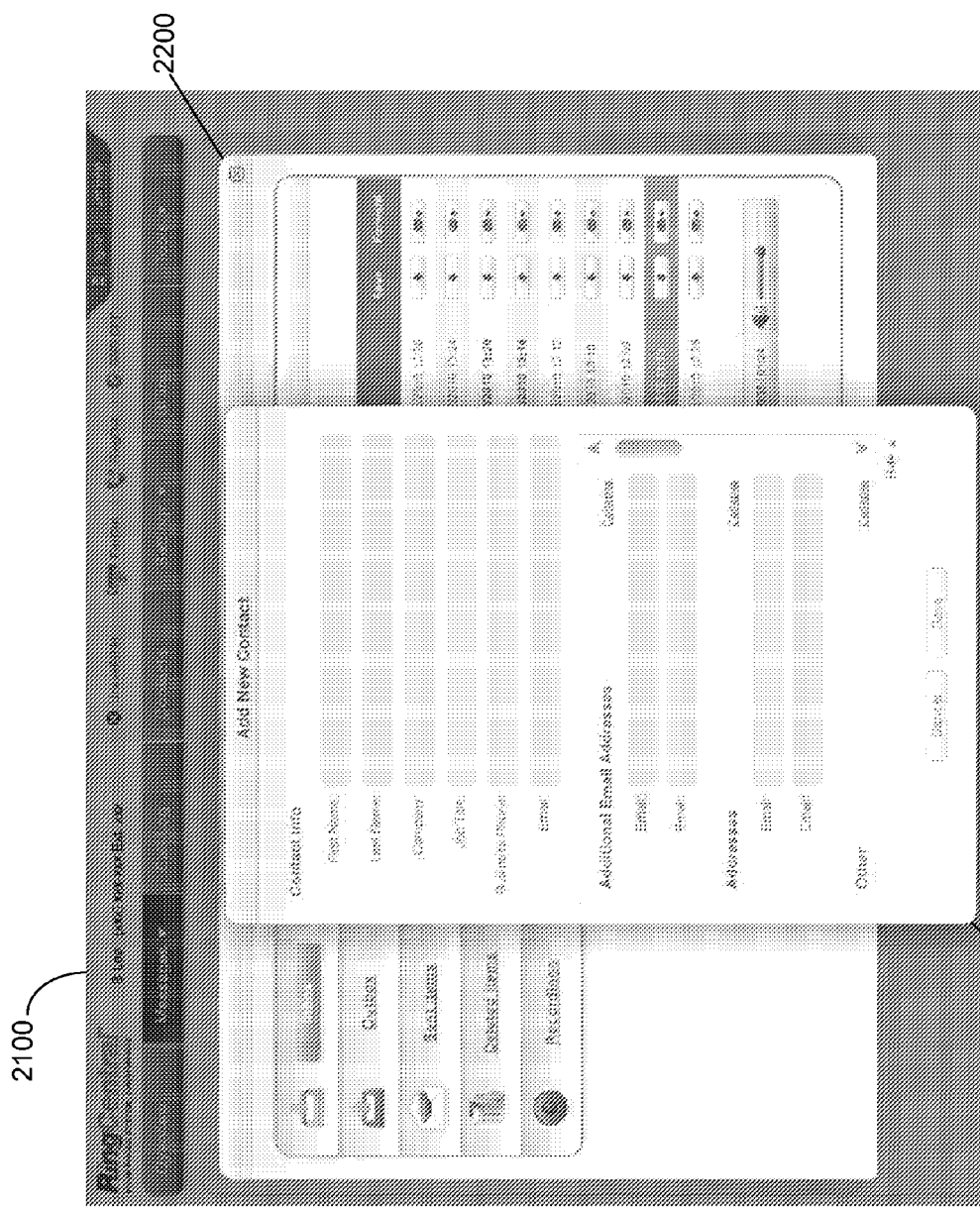

FIG. 22D shows an example of a contact UI 2235 for adding a new contact. The contact UI 2235 may be invoked, for example, upon receiving a user selection of a sender name. As shown in FIG. 22D, upon being invoked, the message UI 2200 executes and displays the contact UI 2235 in a separate pop-up window. The contact UI 2235 may comprise fields for receiving user inputs.

Figure 22E:
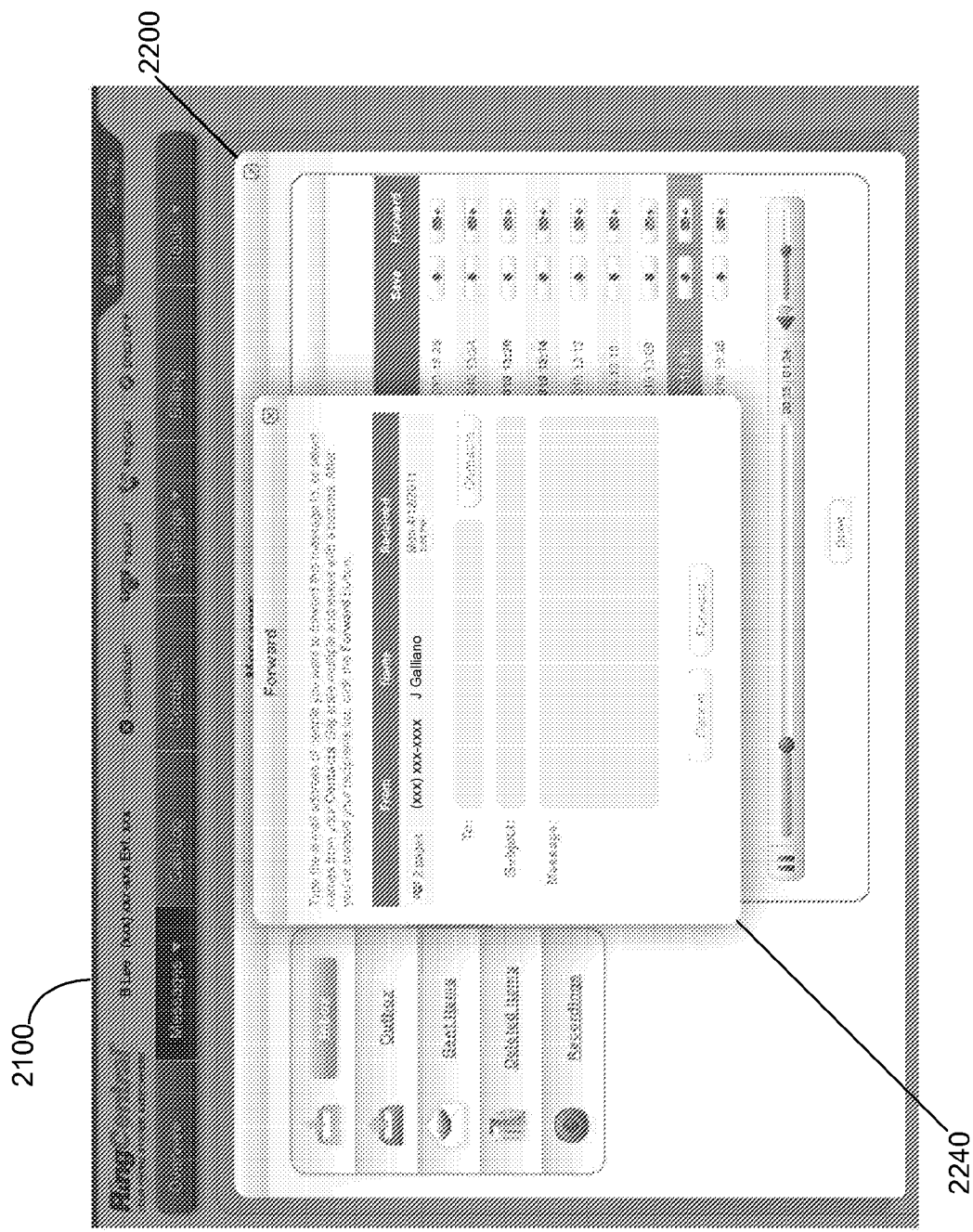

FIG. 22E shows an example of a message forward UI 2240 for forwarding a message to one or more intended recipients. The message forward UI 2240 may be invoked, for example, upon receiving a user selection of "forward" icon. As shown in FIG. 22E, upon being invoked, the message UI 2200 executes and displays the message forward UI 2240 in a separate pop-up window. The message forward UI 2240 may comprise fields for receiving user inputs. The message forward UI 2240 may be used to forward messages of any type (e.g., fax, text, voice, video, picture, etc.), for example, to a phone number or email address.

C. Screen Shots and Functions of the Settings UI

Figure 23A:
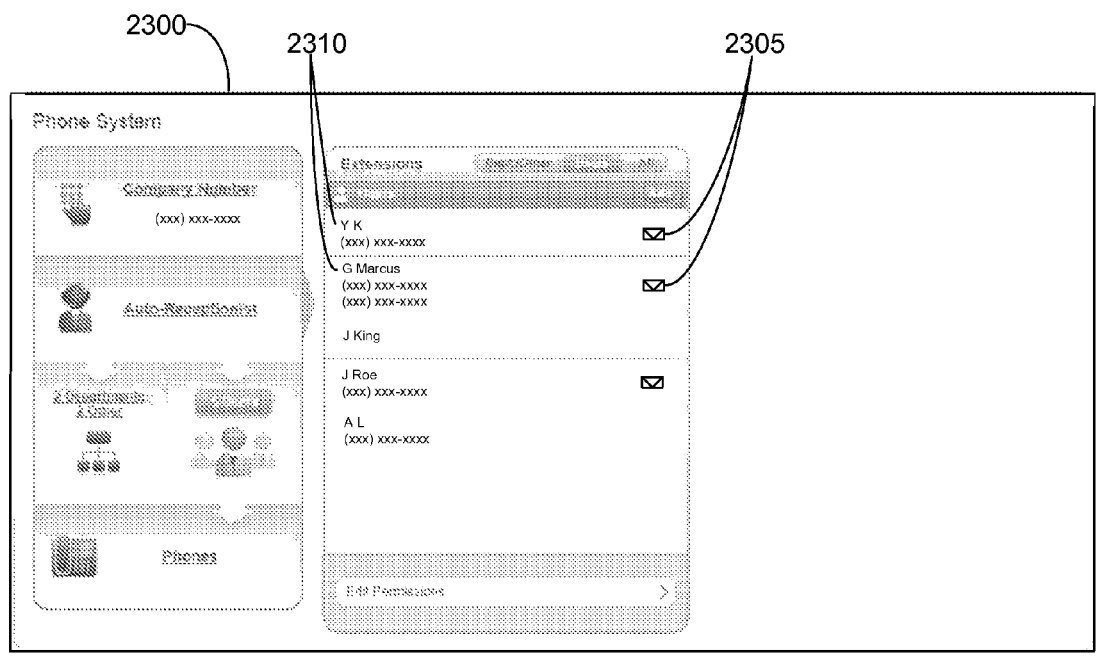
FIGS. 23A-B show exemplary screen pages of a settings UI in accordance with some embodiments.
Figure 23B:
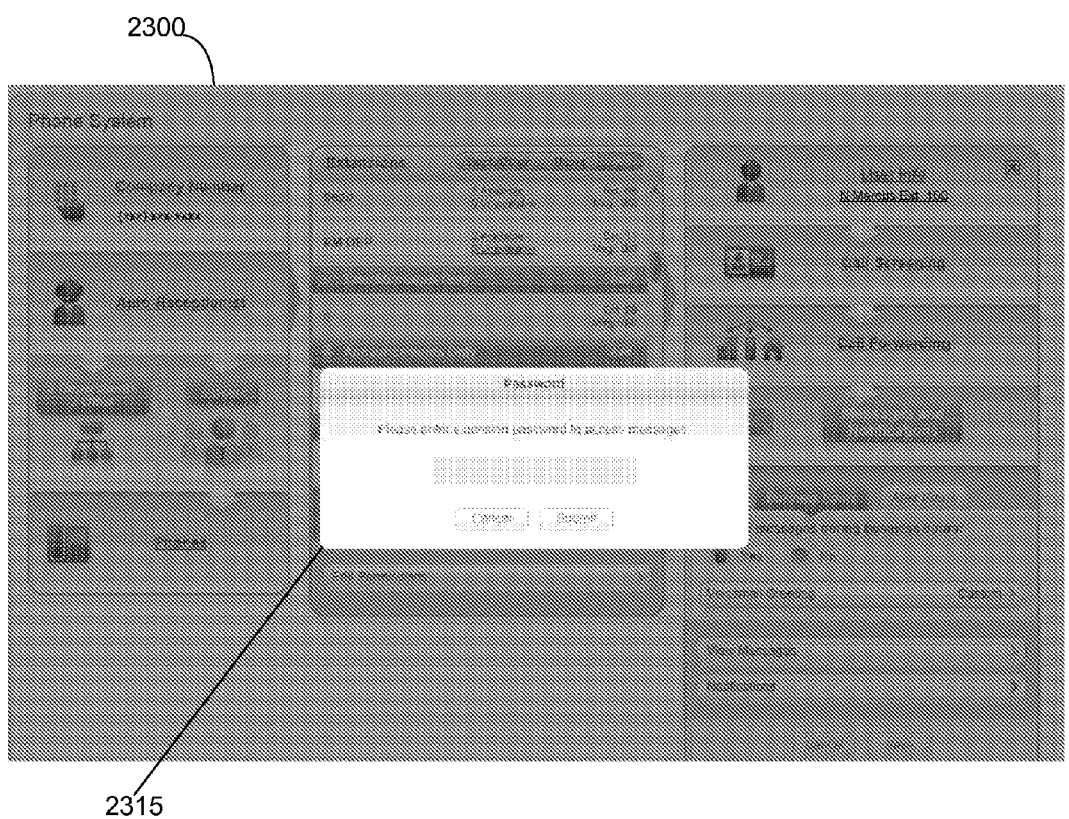

The homepage UI 2100 may receive a user selection of the "settings" icon. If so, the receiving client device 1250 executes the settings UI. FIGS. 23A-B show exemplary screen pages of a settings UI 2300 in accordance with some embodiments. In some embodiments, the receiving client device 1250 may display the settings UI 2300 as a separate pop-up window that overlays the homepage UI 2100.

The settings UI 2300 may be used by an administrator to access messages of other users through the message access system 1230 and to perform various administrative functions. The settings UI 2300 may provide message lists and message files of other users utilizing the devices and methods described herein. The administrator may select for presentation (viewing or playback) any message of any user if the administrator enters the password for the user.

FIG. 23A shows an example of the settings UI 2300 displaying a new message indicator 2305 for a plurality of different users 2310 of a group (e.g., company, location site, division, etc.). The users may be identified by name and/or phone number and extension number. The new message indicator 2305 may indicate if the user has received a new message. FIG. 23B shows an example of a password UI 2315 that is displayed when the administrator selects for presentation a message of a user. Upon entering a correct password, the settings UI 2300 may provide message information and the message file of the selected message utilizing the devices and methods described herein.

Various Embodiments

Some embodiments may be conveniently implemented using a conventional general purpose or a specialized digital computer or microprocessor programmed according to the teachings herein, as will be apparent to those skilled in the computer art. Some embodiments may be implemented by a general purpose computer programmed to perform method or process steps described herein. Such programming may produce a new machine or special purpose computer for performing particular method or process steps and functions (described herein) pursuant to instructions from program software. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information may be represented using any of a variety of different technologies and techniques.

Some embodiments include a computer program product comprising a computer readable medium (media) having instructions stored thereon/in and, when executed (e.g., by a processor), perform methods, techniques, or embodiments described herein, the computer readable medium comprising instructions for performing various steps of the methods, techniques, or embodiments described herein. The computer readable medium may comprise a non-transitory computer readable medium. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, circuits, modules, algorithms, techniques, processes, or method steps of embodiments described herein may be implemented as computer electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The modules, algorithm, techniques, processes, or methods described in connection with embodiments disclosed herein may be embodied directly in computer hardware configured to perform the embodiments disclosed herein, in software executed by a processor, or in a combination of the two. In some embodiments, any software application, program, tool, module, or layer described herein may comprise an engine comprising hardware, software, or a combination of the two configured to perform embodiments described herein. In general, functions of a software application, program, tool, module, or layer described herein may be embodied directly in hardware, or embodied as software executed by a processor, or embodied as a combination of the two.

A software application, layer, or module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

We claim:

1. A message system for managing user messages, the message system comprising:
   a message storage system configured for receiving a plurality of messages of a plurality of different message types through a network connection system and storing the messages and message information associated with the messages in a non-markup language format, the plurality of different message types being selected from a group consisting of: fax messages, text messages, audio messages, video messages, and picture messages;
   a program server configured for serving, in a non-HyperText Transfer Protocol, at least one media user interface file to at least one client device coupled to the program server by the network connection system, the media user interface file comprising executable computer instructions, the media user interface file for installing and executing on the client device for providing a message user interface (UI) engine on the client device, the message UI engine comprising a plurality of embedded media applications for presenting a plurality of different message types, the plurality of embedded media application being selected from a group consisting of: a fax viewer for viewing fax messages, a text viewer for viewing text messages, an audio player for playing audio messages, a video player for playing video messages, and a picture viewer for viewing picture messages; and
   a message server configured for:
      sending a homepage user interface (UI) to the client device, the homepage UI comprising an icon for selecting the message UI engine for executing on the client device;
      receiving, from the message UI engine of the client device, a plurality of selections of messages of a plurality of different message types;
      retrieving the plurality of selected messages from the message storage system; and
      serving, in a non-HyperText Transfer Protocol, the plurality of selected messages of a plurality of different message types to the message UI engine of the client device.

2. The message system of claim 1, wherein:
   a media user interface file comprises only Flash® programming instructions; and
   the program server stores the media user interface files in the Small Web Format (SWF) format.

3. The message system of claim 1, wherein:
   a media user interface file comprises a file format other than markup language format.

4. The message system of claim 1, wherein the message information is formatted in comma-delimited format.

5. The message system of claim 1, wherein the message server is further configured for:
   retrieving message information associated with at least one selected message from the message storage system; and
   sending the message information to the client device using a non-HyperText Transfer Protocol.

6. The message system of claim 1, wherein the non-HyperText Transfer Protocol comprises file transfer protocol (FTP).

7. The message system of claim 1, wherein the network connection system comprises a packet-switched network, a cellular network, or a Public-Switched Telephone Network (PSTN).

8. The message system of claim 1, wherein:
   upon the icon being selected for executing the message UI engine on the client device, the message UI engine automatically sends a request for a message list to the message server, the message list comprising message information for all messages for a particular user.

9. The message system of claim 1, wherein:
   the message server is configured for sending the homepage UI to the client device upon the client device successfully performing a login procedure with the message server.

10. A non-transitory computer readable medium having instructions stored thereon when executed by a processor, manages user messages, the non-transitory computer readable medium comprising instructions for:
   at a message storage system, receiving a plurality of messages of a plurality of different message types through a network connection system and storing the messages and message information associated with the messages in a non-markup language format, the plurality of different message types being selected from a group consisting of: fax messages, text messages, audio messages, video messages, and picture messages;
   at a program server, serving, in a non-HyperText Transfer Protocol, at least one media user interface file to at least one client device coupled to the program server by the network connection system, the media user interface file comprising executable computer instructions, the media user interface file for installing and executing on the client device for providing a message user interface (UI) engine on the client device, the message UI engine comprising a plurality of embedded media applications for presenting a plurality of different message types, the plurality of embedded media application being selected from a group consisting of: a fax viewer for viewing fax messages, a text viewer for viewing text messages, an audio player for playing audio messages, a video player for playing video messages, and a picture viewer for viewing picture messages; and at a message server:
  sending a homepage user interface (UI) to the client device, the homepage UI comprising an icon for selecting the message UI engine for executing on the client device;
  receiving, from the message UI engine of the client device, a plurality of selections of messages of a plurality of different message types;
  retrieving the plurality of selected messages from the message storage system; and
  serving, in a non-HyperText Transfer Protocol, the plurality of selected messages of a plurality of different message types to the message UI engine of the client device.

11. The non-transitory computer readable medium of claim 10, wherein:
  a media user interface file comprises only Flash® programming instructions; and
  the program server stores the media user interface files in the Small Web Format (SWF) format.

12. The non-transitory computer readable medium of claim 10, wherein:
  a media user interface file comprises a file format other than markup language format.

13. The non-transitory computer readable medium of claim 10, wherein the message information is formatted in comma-delimited format.

14. The non-transitory computer readable medium of claim 10, further comprising instructions for:
at the message server:
  retrieving message information associated with at least one selected message from the message storage system; and
  sending the message information to the client device using a non-HyperText Transfer Protocol.

15. The non-transitory computer readable medium of claim 10, wherein the non-HyperText Transfer Protocol comprises file transfer protocol (FTP).

16. The non-transitory computer readable medium of claim 10, wherein the network connection system comprises a packet-switched network, a cellular network, or a Public-Switched Telephone Network (PSTN).

17. The non-transitory computer readable medium of claim 10, wherein:
  upon the icon being selected for executing the message UI engine on the client device, the message UI engine automatically sends a request for a message list to the message server, the message list comprising message information for all messages for a particular user.

18. The non-transitory computer readable medium of claim 10, wherein:
  the message server is configured for sending the homepage UI to the client device upon the client device successfully performing a login procedure with the message server.

19. A system for accessing messages of a message storage system configured for receiving, through a network connection system, a plurality of messages of a plurality of different message types and storing the messages and message information associated with the messages in a non-markup language format, the plurality of different message types being selected from a group consisting of: fax messages, text messages, audio messages, video messages, and picture messages, the system comprising:
a client device configured for:
  receiving, through the network connection system, in a non-HyperText Transfer Protocol, a media user interface file from a program server, the media user interface file comprising executable computer instructions
  installing the media user interface file for configuring a message user interface (UI) engine on the client device, the message UI engine comprising a plurality of embedded media applications for presenting a plurality of different message types, the plurality of embedded media application being selected from a group consisting of: a fax viewer for viewing fax messages, a text viewer for viewing text messages, an audio player for playing audio messages, a video player for playing video messages, and a picture viewer for viewing picture messages;
  receiving, through the network connection system, a homepage user interface (UI) from a message server, the homepage UI comprising an icon for selecting the message UI engine for executing on the client device;
  receiving, from a user, a selection of the icon and executing the message UI engine;
  receiving, through the network connection system, in a non-HyperText Transfer Protocol, a plurality of messages of different message types, the plurality of messages being received by the message UI engine; and
  using the message UI engine for presenting the plurality of messages of different message types by using the plurality of embedded media applications of the message UI engine.

20. The system of claim 19, wherein the message UI engine is compatible with a Flash® Player.

21. The system of claim 19, wherein the client device is further configured for:
  receiving and storing the plurality of messages to a local storage without receiving any user selection for presenting a message;
  receiving a user selection for presenting a selected message; and
  in response to the user selection, presenting the selected message from the local storage device, wherein the response to the user selection is performed without receiving the selected message from the message server.

22. The system of claim 19, wherein the message server streams at least one message to the client device, the at least one message being presented by the client device upon being received by the client device while transmission of the at least one message by the message server continues.

23. The system of claim 19, wherein:
  upon the icon being selected for executing the message UI engine on the client device, the message UI engine automatically sends a request for a message list to the message server, the message list comprising message information for all messages for a particular user.

24. A non-transitory computer readable medium having instructions stored thereon when executed by a processor, accesses messages of a message storage system configured for receiving, through a network connection system, a plurality of messages of a plurality of different message types and storing the messages and message information associated with the messages in a non-markup language format, the plurality of different message types being selected from a group consisting of: fax messages, text messages, audio messages, video messages, and picture messages, the non-transitory computer readable medium comprising instructions for:
at a client device:
  receiving, through the network connection system, in a non-HyperText Transfer Protocol, a media user interface file from a program server, the media user interface file comprising executable computer instructions installing the media user interface file for configuring a message user interface (UI) engine on the client device, the message UI engine comprising a plurality of embedded media applications for presenting a plurality of different message types, the plurality of embedded media application being selected from a group consisting of: a fax viewer for viewing fax messages, a text viewer for viewing text messages, an audio player for playing audio messages, a video player for playing video messages, and a picture viewer for viewing picture messages;

receiving, through the network connection system, a homepage user interface (UI) from a message server, the homepage UI comprising an icon for selecting the message UI engine for executing on the client device;

receiving, from a user, a selection of the icon and executing the message UI engine;

receiving, through the network connection system, in a non-HyperText Transfer Protocol, a plurality of messages of different message types, the plurality of messages being received by the message UI engine; and using the message UI engine for presenting the plurality of messages of different message types by using the plurality of embedded media applications of the message UI engine.

25. The non-transitory computer readable medium of claim 24, wherein the message UI engine is compatible with a Flash® Player.

26. The non-transitory computer readable medium of claim 24, further comprising instructions for:

at the client device:
  receiving and storing the plurality of messages to a local storage without receiving any user selection for presenting a message;
  receiving a user selection for presenting a selected message; and
  in response to the user selection, presenting the selected message from the local storage device, wherein the response to the user selection is performed without receiving the selected message from the message server.

27. The non-transitory computer readable medium of claim 24, wherein the message server streams at least one message to the client device, the at least one message being presented by the client device upon being received by the client device while transmission of the at least one message by the message server continues.

28. The non-transitory computer readable medium of claim 24, wherein:

upon the icon being selected for executing the message UI engine on the client device, the message UI engine automatically sends a request for a message list to the message server, the message list comprising message information for all messages for a particular user.

* * * * *